United States Patent
Babich

(10) Patent No.: US 11,251,833 B2
(45) Date of Patent: Feb. 15, 2022

(54) METHOD OF ENCODING AND DECODING DATA TRANSFERRED VIA A COMMUNICATIONS LINK

(71) Applicant: Skywave Networks LLC, Chicago, IL (US)

(72) Inventor: Kevin J. Babich, Valparaiso, IN (US)

(73) Assignee: Skywave Networks LLC, Chicago, IL (US)

( * ) Notice: Subject to any disclaimer, the term of this patent is extended or adjusted under 35 U.S.C. 154(b) by 0 days.

(21) Appl. No.: 15/929,639

(22) Filed: May 14, 2020

(65) Prior Publication Data

US 2021/0105044 A1 Apr. 8, 2021

Related U.S. Application Data

(63) Continuation of application No. PCT/US2018/061266, filed on Nov. 15, 2018.

(60) Provisional application No. 62/587,744, filed on Nov. 17, 2017.

(51) Int. Cl.
*H04B 3/52* (2006.01)
*H04L 1/00* (2006.01)

(52) U.S. Cl.
CPC ............. *H04B 3/52* (2013.01); *H04L 1/0072* (2013.01)

(58) Field of Classification Search
CPC ................................ H04B 3/52; H04L 1/0072
USPC ........................................................ 375/257
See application file for complete search history.

(56) References Cited

U.S. PATENT DOCUMENTS

| 6,378,101 | B1 | 4/2002 | Sinha et al. |
| 6,601,208 | B2 | 7/2003 | Wu |
| 6,928,608 | B2 | 8/2005 | Peyser et al. |
| 7,152,199 | B2 | 12/2006 | Nuyen et al. |
| 7,447,241 | B2 | 11/2008 | Fujii et al. |

(Continued)

FOREIGN PATENT DOCUMENTS

WO 2008076555 A2 6/2008

OTHER PUBLICATIONS

Arikan, Toros, Thesis—Minimum-Delay HF Communications, University of Illinois at Urbana-Champaign, 60 pages Retrieved from the Internet: https://www.ideals.illinois.edu/bitstream/handle/2142/97507/ARIKAN-THESIS-2017.pdf?sequence=1, Nov. 28, 2017.

(Continued)

*Primary Examiner* — Kevin M Burd
(74) *Attorney, Agent, or Firm* — Woodard, Emhardt, Henry, Reeves & Wagner, LLP

(57) ABSTRACT

A communication system uses multiple communications links, preferably links that use different communications media. The multiple communications links may include a high latency/high bandwidth link using a fiber-optic cable configured to carry large volumes of data but having a high latency. The communications links may also include a low latency/low bandwidth link implemented using skywave propagation of radio waves and configured to carry smaller volumes of triggering data with a lower latency across a substantial portion of the earth's surface. The triggering data may be sent in a data stream as data frames without headers, security information, or error checking codes. The two communications links may be used together to coordinate various activities such as the buying and selling of financial instruments.

31 Claims, 10 Drawing Sheets

(56) References Cited

U.S. PATENT DOCUMENTS

| | | | |
|---|---|---|---|
| 8,176,402 B2 | 5/2012 | Yokokawa et al. | |
| 8,683,292 B2 | 3/2014 | Lee et al. | |
| 8,694,871 B2 | 4/2014 | Miyazaki | |
| 8,782,489 B2 | 7/2014 | Eroz et al. | |
| 8,930,789 B1 | 1/2015 | Dave et al. | |
| 9,136,938 B1* | 9/2015 | Babich | H04L 45/24 |
| 9,141,992 B2 | 9/2015 | Fallon et al. | |
| 9,203,431 B2 | 12/2015 | Lee et al. | |
| 2011/0150351 A1 | 6/2011 | Singh et al. | |
| 2011/0243154 A1 | 10/2011 | Flynn et al. | |
| 2012/0087497 A1* | 4/2012 | Mantin | H04N 19/159 |
| | | | 380/210 |
| 2013/0279604 A1 | 10/2013 | Karaoguz et al. | |
| 2014/0086588 A1 | 3/2014 | Kawanishi et al. | |
| 2014/0307759 A1* | 10/2014 | Sundar | H04B 3/32 |
| | | | 375/219 |
| 2016/0197669 A1 | 7/2016 | Babich | |
| 2016/0211941 A1 | 7/2016 | Shen et al. | |
| 2020/0244352 A1 | 7/2020 | Babich | |
| 2020/0328841 A1 | 10/2020 | Babich et al. | |
| 2020/0328844 A1 | 10/2020 | Babich et al. | |
| 2020/0328918 A1 | 10/2020 | Babich et al. | |
| 2020/0328919 A1 | 10/2020 | Babich et al. | |
| 2020/0366367 A1 | 11/2020 | Babich | |
| 2021/0058150 A1 | 2/2021 | Babich | |
| 2021/0058151 A1 | 2/2021 | Babich | |
| 2021/0067239 A1 | 3/2021 | Babich | |
| 2021/0075494 A1 | 3/2021 | Babich | |
| 2021/0075502 A1 | 3/2021 | Babich | |
| 2021/0075562 A1 | 3/2021 | Babich | |
| 2021/0075584 A1 | 3/2021 | Babich | |

OTHER PUBLICATIONS

Frederick H. Raab et al., Raab, F.H. et al., "HF, VHF, and UHF Systems and Technology", IEEE Transaction on Microwave Theory and Techniques, vol. 50, issue No. 3, pp. 888-899., 12 pages, Mar. 1, 2002.

EP, App. No. 18877913.5 Extended European Search Report, 10 pages, dated Jul. 12, 2021.

* cited by examiner

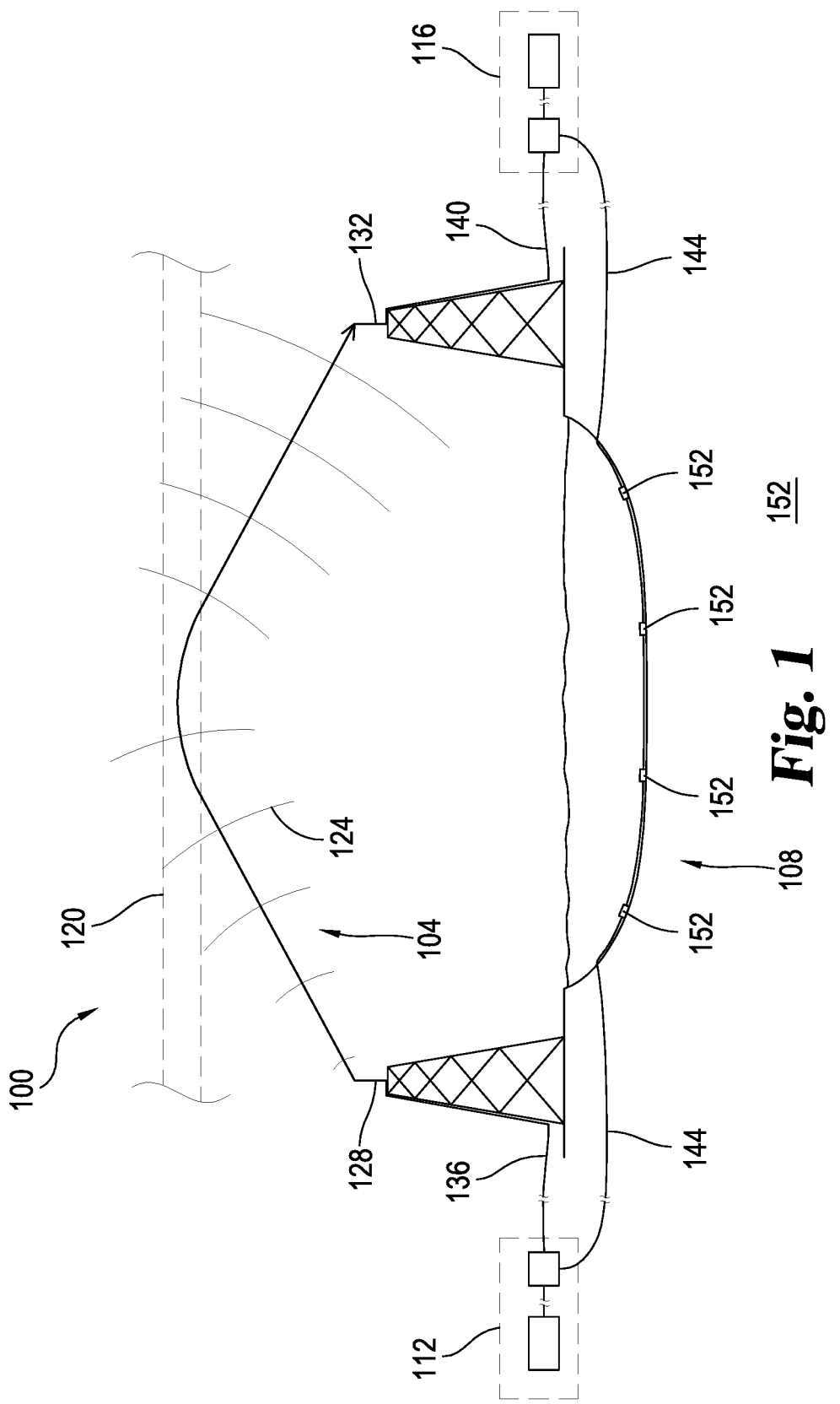

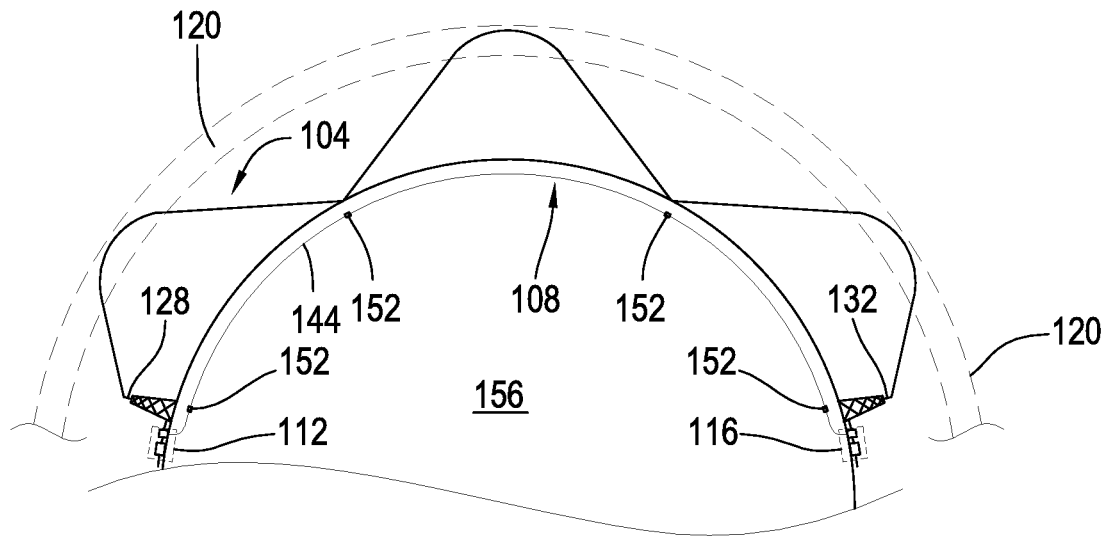
Fig. 2 *PRIOR ART*
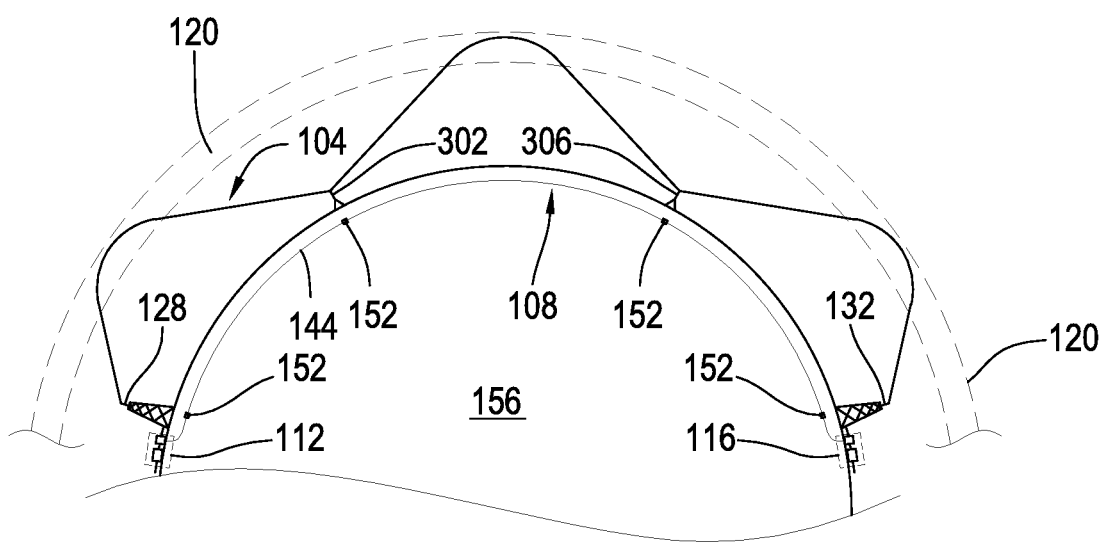
Fig. 3 *PRIOR ART*

METHOD OF ENCODING AND DECODING DATA TRANSFERRED VIA A COMMUNICATIONS LINK

CROSS REFERENCE TO RELATED APPLICATIONS

This application is a continuation of International Patent Application Number PCT/US2018/061266, filed Nov. 15, 2018, which is hereby incorporated by reference. International Patent Application Number PCT/US2018/061266, filed Nov. 15, 2018, claims the benefit of U.S. Patent Application No. 62/587,744, filed Nov. 17, 2017, which are hereby incorporated by reference.

BACKGROUND

Recent technological improvements have dramatically improved the ability to communicate across vast distances. Extensive fiber optic and satellite networks now allow remote parts of the world to communicate with one another. However, by spanning across these great distances, such as across the Atlantic or Pacific Oceans, fiber optic cables can incur a round-trip latency or time lag of about 60 msec or more. Satellite communications can experience even greater lag times. In many cases, this high latency cannot be overcome because it is inherent in the communications medium and equipment. For example, light may traverse an optical fiber 30-40% more slowly than a radio wave traveling the same distance through free space. Fiber optic networks typically require multiple repeaters that further increase latency. While generally not problematic in a number of circumstances, this high latency can cause unacceptable delays in the execution of time sensitive activities, especially time sensitive activities that require complex logic and/or are dependent on conditions that rapidly change. In addition, many communications links encode the data with multiple layers of additional data such as headers, delimiters, security information, and error checking codes. These help to ensure delivery, but also add to the overall latency in the transmission. These latency issues can for example create problems for a whole host of activities, such as in the operation and/or synchronization of distributed computer systems, scientific experiments with geographically large sensor arrays, and telemedicine/diagnostic activities, to name just a few. In one particular example, orders to buy and sell securities or other financial instruments in world markets typically rely on communications links that carry data and instructions over systems using fiber optic lines, coaxial cables, or microwave communication links. Any delays in executing an order, such as caused by the high latency across fiber optic lines, can lead to significant financial losses.

SUMMARY

A unique communication system and method has been developed to address the above-mentioned latency issues as well as other issues. In the communication system, command data is transmitted so as to be received at a receiving station before (or at the same time) triggering data is received. The command data includes one or more directives, instructions, algorithms, and/or rules for controlling a machine, such as a computer and/or mechanical device, to take one or more actions. For example, the command data in one form includes a program for buying and/or selling particular options or stocks at certain price levels, ranges, and/or based on other conditions. Command data is typically (but not in all circumstances) larger in size than the triggering data such that the command data takes longer than the triggering data to transmit over communication links having the same data bandwidth. The triggering data includes information identifying one or more commands in the command data to execute. For example, the triggering data can identify one or more particular options in the command data that identifies the particular stock (or multiple stocks) to purchase at a particular price (or prices). In one example, the command data is transmitted over a communication link that has high bandwidth and high latency, such as over a fiber optic cable, and the triggering data is transmitted over a communication link that has low bandwidth and low latency, such as through sky-wave propagation by refracting and/or scattering radio waves from the ionosphere. The relatively small-sized triggering data is then able to be more quickly received at a receiving station than if the triggering data was transmitted over the high bandwidth and high latency communication link provided by fiber optic cable. This communication system and method dramatically reduces the time to execute complex time-sensitive actions, such as financial transactions, over large distances at remote locations. In one form, this technique is used to remotely perform actions past the radio horizon, such as for transatlantic communications. This technique can be adapted for one-way type communications or even two-way type communications.

This unique communication system and method in one example uses multiple communications links. In one form, the communication links use different communications media. Such a system might be used, for example, to transmit a large collection of preprogrammed commands or rules over a high latency/high bandwidth link in advance of a triggering event which may be a market event, news report, a predetermined date and time, and the like. This set of rules or preprogrammed actions may be sent as a software update to an executable program, or as a firmware upgrade for a Field Programmable Gate Array (FPGA). When a triggering event occurs, triggering data can be sent over a low latency/low bandwidth link alone, or over both links, causing the preprogrammed commands to be executed as planned.

In one example of the system, the low latency/low bandwidth communications link uses radio waves to transmit data in concert with the higher latency/high bandwidth communications link which may be a packet switched network operating over fiber optic cables. Such a combination may include various combinations with widely varying differentials between the high and low latency links. The low latency link may use high frequency (HF) radio waves to transmit over a propagation path between North America and Europe. Radio waves may transmit, for example, with a one-way latency of 20 to 25 ms or less (40 to 50 ms round trip). A higher latency link may carry data over a different propagation path, or perhaps through a different medium between the same two continents that, for example, may have a latency of about 30 ms or more one-way, or 60 ms or more both ways.

The system may also constantly monitor and use different HF bands to maintain the highest available signal strength between remote locations depending on solar and atmospheric conditions. This monitoring may include accessing third-party data, analyzing results obtained by experimentation, and/or using software modeling. These conditions can be particularly important in the low latency link which may use skywave propagation to relay HF transmissions over long distances. This skywave propagation may be augmented by repeater stations on the ground or possibly in the air.

In another aspect, overall security of the system may be enhanced by sending a continual stream of actions and/or triggering messages over the separate communications links to confuse malicious third parties and discourage attempts to intercept and decipher future transmissions. These messages may be very short, or intermingled with various other transmissions which may go on continuously, or for only short periods of time on a predetermined schedule. In a related aspect, security may be enhanced by sending short messages over skywave propagation on one or more frequencies, or by sending small parts of a message on several frequencies at the same time. Various additional techniques may also be employed to enhance security such as encryption, two-way hashing, and the like, which may incur additional latency in both links.

Also disclosed is a system and method for encoding digital communications that facilitates multiple message processing methods, multiple message length encoding schemes, and different levels of error detection and/or error correction, while reducing transmission overhead and latency.

Data messages are encoded and transmitted with different headers, frame sizes, validation codes using multiple different encoding algorithms. These include different Cyclic Redundancy Check (CRC) polynomial equations, depending on how the frame is to be processed on receipt. Multiple decoding algorithms parse an incoming bit stream from a receiver, using each decoding algorithm operating in parallel. If an incoming data frame is validated by one of the decoding algorithms, the frame is processed according to that corresponding algorithm. Different encoding algorithms cause the decoder to forward the message as coded in a single frame, buffer and re-assemble a longer message transmitted in multiple frames, apply additional processing to convert the framed data to a message, interpret the framed data as an instruction or control code, or use the framed data in some other way. No additional data bits are needed to signal how to process each frame in the intended way.

The system can also encode messages using two or more pre-determined frame sizes. The message can be transmitted with redundant data for message framing and validation, such as CRC framing appropriate for the frame size. The decoder can parse the incoming bit stream from a receiver using algorithms for each allowable frame length operating in parallel. When an incoming frame is validated by one of these parallel processes, the frame is processed by the decoder. This process allows shorter messages to be handled with less latency and overhead, and without the need for message length headers, control codes, or other headers that would increase transmission overhead.

Messages may also be encoded and transmitted with redundant data for message framing and validation, such as CRC framing with or without error correction coding. Two or more different encoding algorithms can be used depending on the level of error detection and correction desired. The decoder processes the incoming bit stream from a receiver using algorithms appropriate for each pre-determined error detection and correction method operating in parallel. If an incoming frame is validated by one of these parallel processes, the frame is processed by the decoder and the decoded message is forwarded. This method allows less critical messages to be processed with less latency and overhead than with a fixed error detection and correction algorithm. More critical messages can have additional error detection and/or error correction overhead added to the message only as needed. Encoding algorithms can be changed in real time without the need for encoding headers or control codes to notify the decoder.

So as to aid in appreciating the unique features of this communication system and method, the communication system and method will be described with reference to executing trades of stocks, bonds, futures, or other financial instruments, but it should be recognized that this system and method can be used in a large number of other fields where latency is a concern, such as for distributed computing, scientific analysis, telemedicine, military operations, etc.

Further forms, objects, features, aspects, benefits, advantages, and embodiments of the present invention will become apparent from a detailed description and drawings provided herewith.

BRIEF DESCRIPTION OF THE DRAWINGS

FIG. 1 is a schematic diagram of a system for transmitting data over separate communication links, one of which uses skywave propagation.

FIG. 2 is a schematic diagram further illustrating the skywave propagation of FIG. 1

FIG. 3 is a schematic diagram illustrating the use of ground-based repeaters in the skywave propagation of FIG. 1.

DETAILED DESCRIPTION

Figure 4:
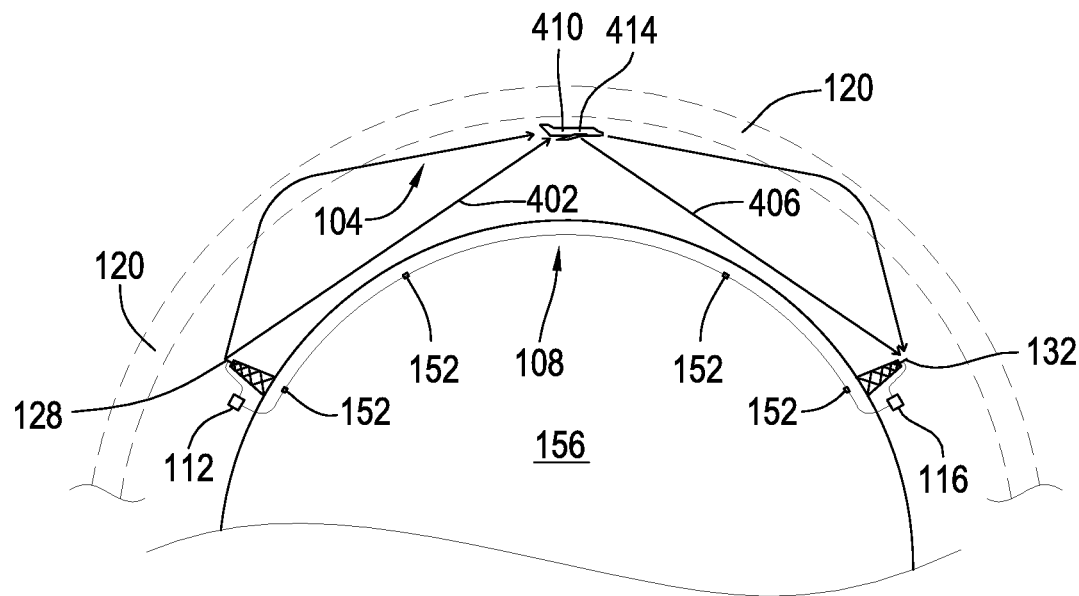
FIG. 4 is a student schematic diagram illustrating the use of airborne repeaters in the skywave propagation of FIG. 1.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates at 100 one example of a system configured to transfer data via a low latency, low bandwidth communication link 104, and separate data via a high latency, high bandwidth communication link 108. Communication links 104 and 108 provide separate connections between a first communication node 112 and a second communication node 116. Low latency connection 104 may be configured to transmit data using electromagnetic waves 124 passing through free space via skywave propagation. Electromagnetic waves 124 may be generated by a transmitter in first communication node 112, passed along a transmission line 136 to an antenna 128. Waves 124 may be radiated by antenna 128 encountering an ionized portion of the atmosphere 120. This radiated electromagnetic energy may then be refracted by the ionized portion of the atmosphere 120 causing waves 124 to redirect toward earth. Waves 124 may be received by a receiving antenna 132 coupled to second communications node 116 by transmission line 140. As illustrated in FIG. 1, a transmitting communication node may use skywave propagation to transmit electromagnetic energy long distances across the earth surface without the need of one or more transmission lines to carry the electromagnetic energy.

Data may also be transmitted between communications nodes 112 and 116 using a high latency communication link 108. As illustrated in FIG. 1, high latency communication link 108 may be implemented using a transmission line 144 passing through the earth, which may include passing under or through an ocean or other body of water. As shown in FIG. 1, the high latency communication link may include repeaters 152. FIG. 1 illustrates four repeaters 152 along transmission line 144 although any suitable number of repeaters 152 may be used. Transmission line 144 may also have no repeaters at all. Although FIG. 1 illustrates communication link 104 transmitting information from first communication node 112 to second communication node 116, the data transmitted may pass along communication links 104, 108 in the both directions.

The configuration shown in FIG. 1 is further illustrated in FIG. 2 where first communication node 112 and second communication node 116 are geographically remote from one another separated by a substantial portion of the surface of the earth (156). This portion of the earth's surface may include one or more continents, oceans, mountain ranges, or other geographic areas. For example, the distance spanned in FIGS. 1-7 may cover a single continent, multiple continents, an ocean, and the like. In one example, node 112 is in Chicago, Ill. in the United States of America, and node 116 is in London, England, in the United Kingdom. In another example, node 112 is in New York City, N.Y., and node 116 is in Los Angeles, Calif., both cities being in North America. Any suitable combination of distance, communication nodes, and communications links is envisioned that can provide satisfactory latency and bandwidth.

FIG. 2 illustrates that skywave propagation allows electromagnetic energy to traverse long distances. Using skywave propagation, low latency communication link 104 transmits electromagnetic waves 124 into a portion of the atmosphere 120 that is sufficiently ionized to refract electromagnetic waves 124 toward the earth. The waves may then be reflected by the surface of the earth and returned to the ionized portion of the upper atmosphere 120 where they may be refracted toward earth again. Thus electromagnetic energy may "skip" repeatedly allowing the low latency, low bandwidth signals 124 to cover distances substantially greater than those which may be covered by non-skywave propagation.

Another example of the system illustrated in FIG. 1 appears in FIG. 3 where the skywave propagation discussed with respect to FIGS. 1 and 2 may be enhanced using repeaters 302 and 306. In this example, first repeater 302 may receive the low latency communication signals emanating from antenna 128. The signals may be refracted by the ionized region 120 and returned to earth where they may be received by repeater 302 and retransmitted via sky-wave propagation. The refracted signal may be received by repeater 306 and retransmitted using skywave propagation to second communications node 116 via antenna 132. Although two repeating stations are illustrated in FIG. 3, any suitable number, configuration, or positioning of ground repeating stations 302 is considered. Increasing the number of repeaters 302, 306 may provide for the opportunity to transmit low latency signals over greater distances in a wider array of atmospheric missions, however, the physical limitations of the repeater circuitry that receives and retransmits the signal may add additional latency to low latency communication link 104.

FIG. 4 illustrates another example of the system illustrated in FIG. 1 where one or more repeaters along the first communications link are airborne, such as in an aircraft, dirigible, balloon, or other device 410 configured to maintain the repeater aloft in the atmosphere. In this example, signals transmitted from first communications node 112 via antenna 128 may be received by an airborne repeater 414 either as line of sight communication 402, or by sky-wave propagation as described herein elsewhere. The signals may be received by airborne repeater 414 and retransmitted as line of sight communication 406, or by skywave propagation to the second communications node 116 along the low latency link 104.

Figure 5:
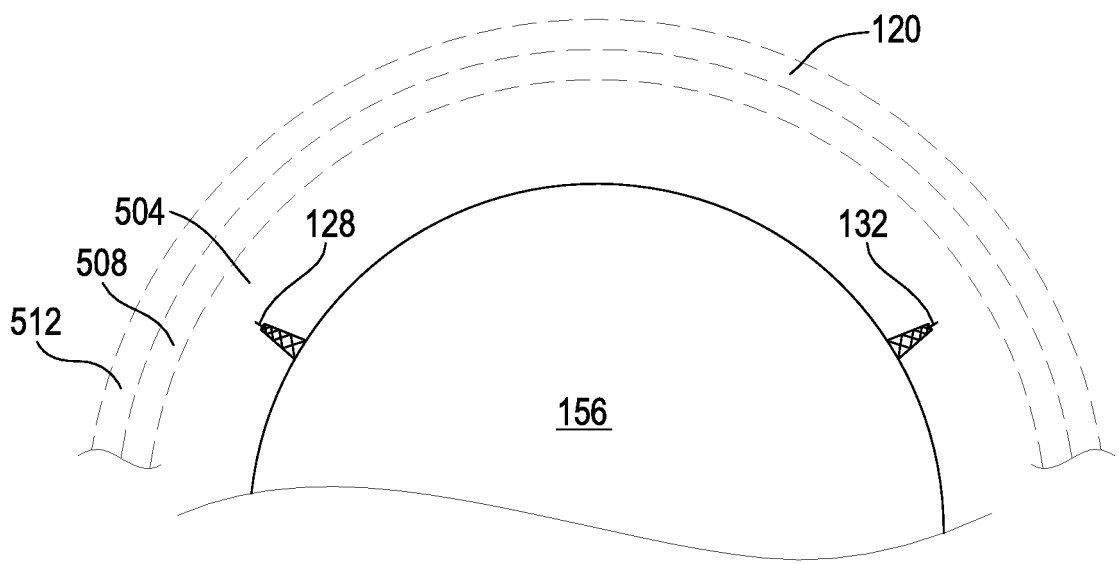
FIG. 5 is a schematic diagram illustrating additional layers of the atmosphere including the ionized layer shown in FIG. 1.
Figure 6:
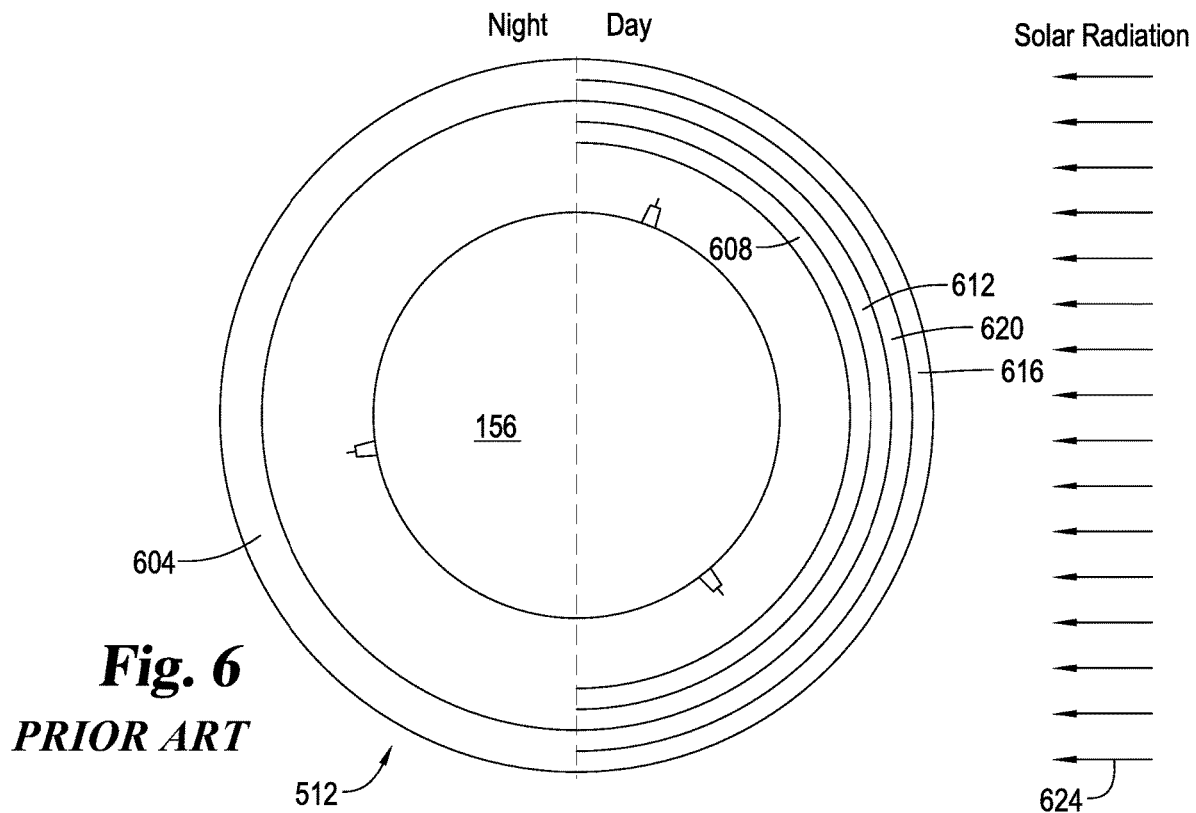
FIG. 6 is a schematic diagram illustrating various ionized layers of the atmosphere shown in FIG. 5.
Figure 7:
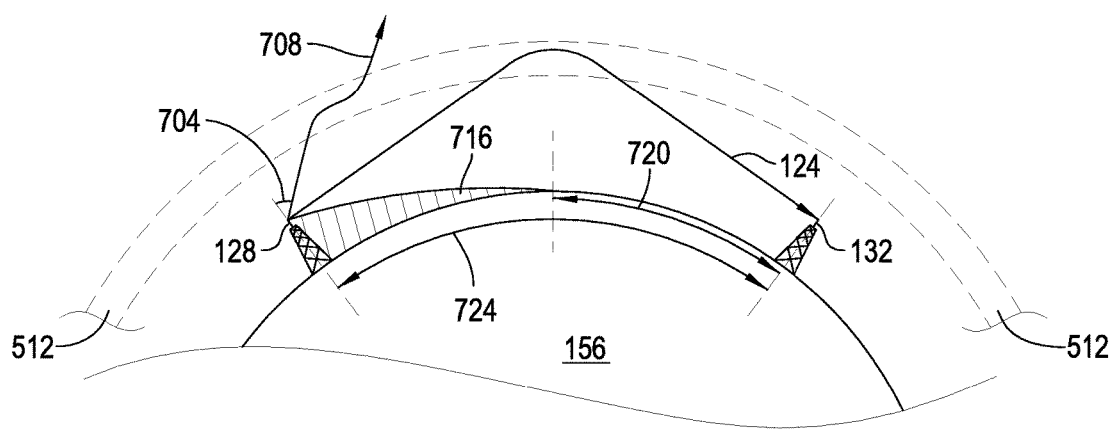
FIG. 7 is a schematic diagram illustrating additional details of skywave propagation generally illustrated in FIGS. 1-6.

Additional details regarding skywave propagation are illustrated in FIGS. 5-7. The relation to the system disclosed and various layers of the upper atmosphere is illustrated in FIG. 5. For purposes of radio transmission, the layers of the upper atmosphere may be divided as shown into successively higher layers such as the troposphere 504, the stratosphere 508, and the ionosphere 512.

The ionosphere is named as such because it includes a high concentration of ionized particles. The density of these particles in the ionosphere furthest from earth is very low and becomes progressively higher in the areas of the ionosphere closer to earth. The upper region of the ionosphere is energized by powerful electromagnetic radiation from the sun which includes high-energy ultraviolet radiation. This solar radiation causes ionization of the air into free electrons, positive ions, and negative ions. Even though the density of the air molecules in the upper ionosphere is low, the radiation particles from space are of such high energy that they cause extensive ionization of the relatively few air molecules that are present. The ionization extends down through the ionosphere with diminishing intensity as air becomes denser with the highest degree of ionization thus occurring at the upper extremities of the ionosphere, while the lowest degree occurs in the lower portion of the ionosphere.

These differences in ionization between the upper and lower extremities of the ionosphere 512 are further illustrated in FIG. 6. The ionosphere is illustrated in FIG. 6 with three layers designated, respectively, from lowest level to highest level as D layer 608, E layer 612, and F layer 604. The F layer 604 may be further divided into two layers designated F1 (the higher layer) at 616 and F2 (the lower layer) at 620. The presence or absence of layers 616 and 620 in the ionosphere and their height above the earth vary with the position of the sun. At high noon, radiation from the sun 624 passing into the ionosphere is greatest, tapering off at sunset and at a minimum at night. When the radiation is removed, many of the ions recombine causing the D layer 608 and the E layer 612 to disappear, and further causing the F1 and F2 layers 616, 620 to recombine into a single F layer 604 during the night. Since the position of the sun varies with respect to a given point on earth, the exact characteristics of layers 608, 612, 616, and 620 of ionosphere 512 can be extremely difficult to predict but may be determined by experimentation.

The ability for a radio wave to reach a remote location using skywave propagation depends on various factors such as ion density in layers 608-620 (when they are present), the frequency of the transmitted electromagnetic energy, and the angle of transmission. For example, if the frequency of a radio wave is gradually increased, a point will be reached where the wave cannot be refracted by D layer 608 which is the least ionized layer of ionosphere 512. The wave may continue through the D layer 608 and into the E layer 612 where its frequency may still be too great to refract the singles passing through this layer as well. The waves 124 may continue to the F2 layer 620 and possibly into the F1 layer 616 as well before they are bent toward earth. In some cases, the frequency may be above a critical frequency making it impossible for any refraction to occur causing the electromagnetic energy to be radiated out of the earth's atmosphere (708).

Thus, above a certain frequency, electromagnetic energy transmitted vertically continues into space and is not refracted by ionosphere 512. However, some waves below the critical frequency may be refracted if the angle of propagation 704 is lowered from the vertical. Lowering the angle of propagation 704 also allows electromagnetic waves 124 transmitted by antenna 128 to be refracted toward Earth's surface within a skip zone 720 making it possible to traverse a skip distance 724 and reach a remote antenna 132. Thus the opportunity for successful skywave propagation over a certain skip distance 724 is further dependent on the angle of transmission as well as the frequency, and therefore the maximum usable frequency varies with the condition of the ionosphere, desired skip distance 724, propagation angle 704. FIG. 7 also illustrates that non-skywave propagation such as groundwave signals and/or line of sight signals 716 are unlikely to traverse skip distance 724.

Figure 8:
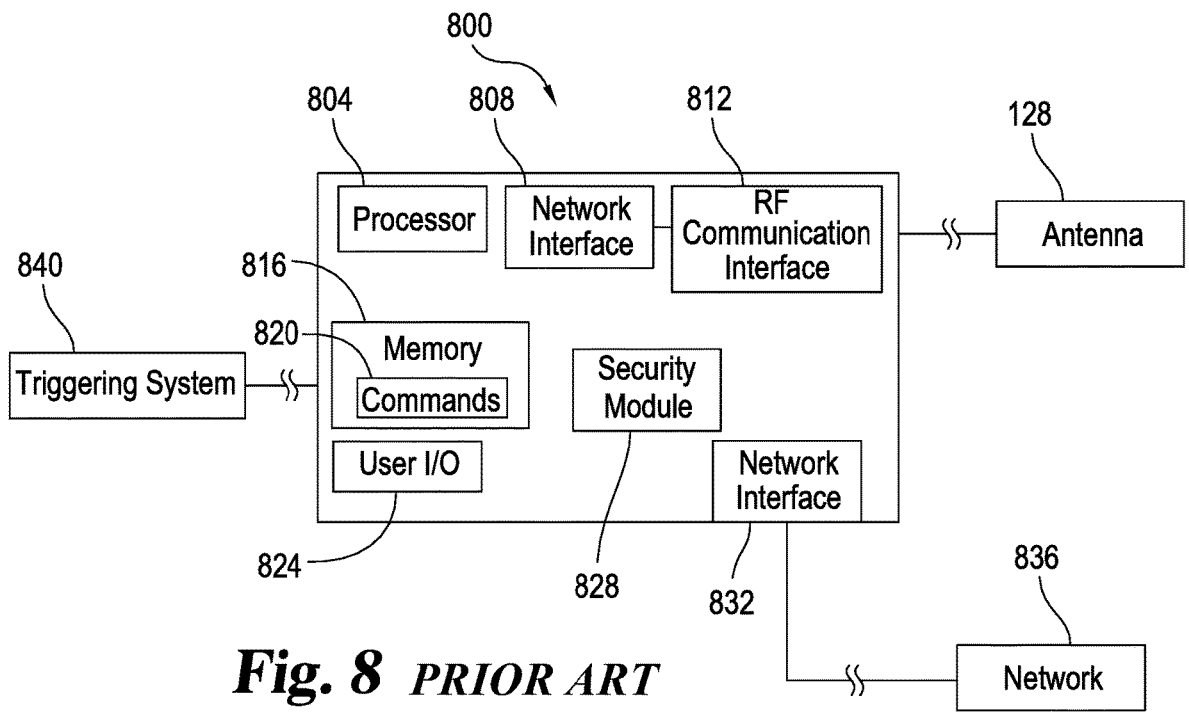
FIG. 8 is a schematic diagram illustrating additional detail for the communication nodes of FIG. 1.

FIG. 8 illustrates one example of additional aspects of a communication node 800 which is like communication nodes 112 and 116. Communication node 800 can include a processor 804 for controlling various aspects of communication node 800. The processor may be coupled to a memory 816 useful for storing rules or command data 820. Devices for accepting user input and providing output (I/O) to a user (824) may also be included. These devices may include a keyboard or keypad, a mouse, a display such as a flat panel monitor and the like, a printer, plotter, or 3D printer, a camera, or a microphone. Any suitable devices for user I/O may be included. Node 800 may also include a network interface 832 responsive to the processor 804 and coupled to a communication network 836. A security module 828 may be included as well and may be used to reduce or eliminate the opportunity for third-parties to intercept, jam, or change data as it passes between communications nodes 800. In one example, communication node 800 is implemented as a computer executing software to control the interaction of the various aspects of node 800.

Network interface 836 may be configured to send and receive data such as command data 820, or triggering data which may be passed from a triggering system 840. Communication network 836 may be coupled to a network such as the internet and configured to send and receive data without the use of skywave propagation. For example, communication network 836 may transmit and receive data over optical fibers or other transmission lines running along the earth similar to transmission lines 144 illustrated in previous figures.

Node 800 may include a second network interface 808 responsive to processor 804 and coupled to a radio-frequency communication interface 812. This second network interface 808 may be used to transfer data such as command data 820 or triggering data passed from triggering system 840. Network interface 808 may be coupled to an antenna like antenna 128 which may include multiple antennas or antenna elements. The radio-frequency communication interface 808 may be configured to send and receive data such as triggering data using electromagnetic waves transmitted and/or received via antenna 128. As discussed above, antenna 128 may be configured to send and receive the electromagnetic waves via skywave propagation.

Figure 9:
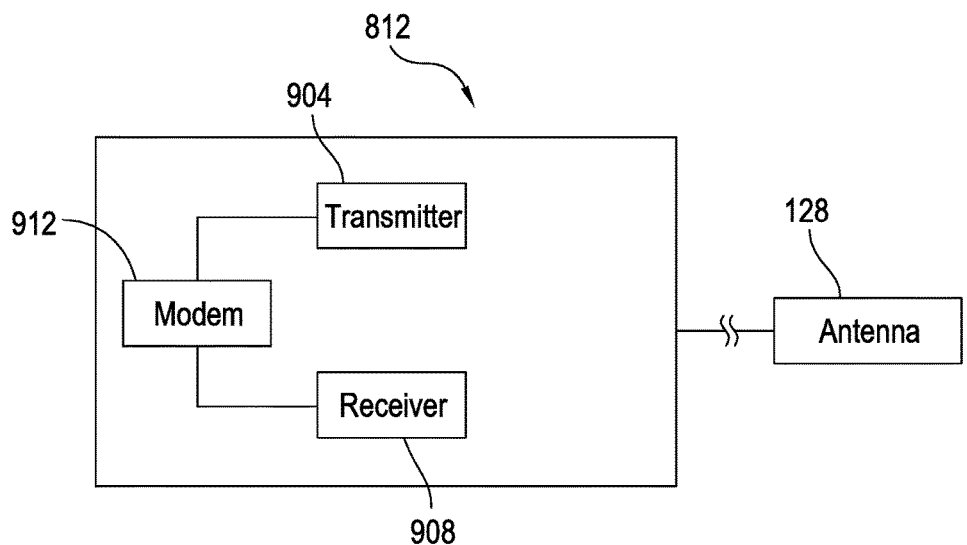
FIG. 9 is a schematic diagram illustrating additional detail for the RF communication interface in FIG. 8.

Node 800 may include additional aspects illustrated in FIG. 9. Radio-frequency communication interface 812 may include a transmitter 904 configured to transmit electromagnetic energy using antenna 128. Receiver 908 may optionally be included as well and configured to receive electromagnetic waves from antenna 128. Transmitter 904 and receiver 908 may also be coupled to a modem 912 configured to modulate signals received by interface 812 to encode information or data from a digital stream for transmission by transmitter 904. Modem 912 may also be configured to demodulate signals received by receiver 908 from antenna 128 to decode the transmitted signal into a digital data stream usable by processor 804 or that may be stored in memory 816.

FIGS. 10 through 13 illustrate examples of the disclosed system in operation illustrating how various networks can be used either alone, or in concert, to transmit command and triggering data corresponding with various events. FIGS. 10-13 illustrate the use of two separate communications links labeled "A" and "B." These links may use any suitable communication link separately or in tandem as shown. For example, communication link A may be a low latency link like communication link 104, and communication link B may be a high latency link like communication link 108. In another example, both links A and B may be low latency communication links. In yet another example, both communication links may be high latency communication links. In another aspect, any combination of data bandwidth may be used for links A and B. For example, link A may be a low latency link with either high or low data bandwidth, and link B may be a high latency link with either high or low data bandwidth.

More specifically, in one example, link A is a low latency/low bandwidth communication link carrying triggering signals and is implemented as discussed herein using HF radio waves propagated via skywave propagation. In this example, link B is a high latency/high bandwidth communication link carrying command data and is implemented as discussed herein using fiber-optic cables, coaxial cables, or other transmission lines.

Figure 10:
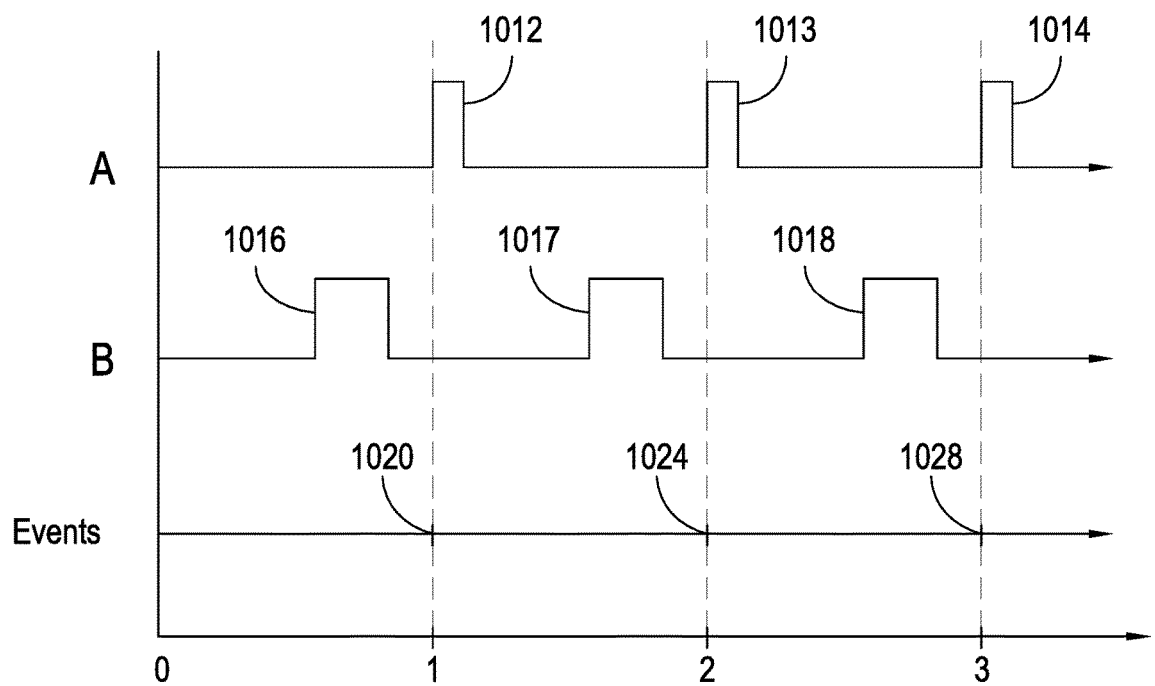
FIGS. 10-13 are timing diagrams illustrating the coordinated use of multiple communication links like those illustrated in FIGS. 1-9.

FIG. 10 illustrates such a system in operation illustrating links A and B passing data corresponding to events 1020, 1024, and 1028 as time passes. In FIG. 10, link B is illustrated as having a higher data bandwidth and higher latency than low latency link A. High latency link B is utilized to transfer command data over a period of time prior to corresponding successive events. Before event 1020, command data 1016 may be transferred over high latency link B taking a relatively short amount of time to transfer a large volume of data due to the higher data bandwidth of link B. At about the time event 1020 occurs, a triggering signal 1012 may be transmitted over low latency link A. The triggering signal 1012 may include an identifier identifying one or more commands to be executed by a processor such as processor 804.

This process may be repeated multiple times were data 1017 corresponding with a subsequent event 1024 may be transferred over high latency link B ahead of event 1024. Trigger signal 1013 may then be sent over low latency link A using skywave propagation in response to event 1024 resulting in the execution of various instructions or rules in a processor of the receiving communications node. Event 1028 may cause the system to send trigger 1024 which may select commands sent along with data 1018 in advance. Thus FIG. 10 illustrates a successive transfers of data 1016, 1017, and 1018 over high latency link B from one communications node to a remote communications node. As events 1020, 1024, and 1028 occur over time, triggering signals 1012, 1013, 1014 may be triggered using low latency link A to quickly transfer information configured to trigger the remote receiving communications node to act on commands or other aspects of data 1016, 1017, and 1018 sent before the corresponding events take place.

Other configurations and uses of links A and B are envisioned as well. In another example, link A is a low latency/low bandwidth communication link carrying both command data and triggering signals and is implemented as discussed herein using HF radio waves propagated via skywave propagation. In this example, link B is a high latency/high bandwidth communication link carrying command data and triggering data, and is implemented as discussed herein using fiber-optic cables, coaxial cables, or other transmission lines.

Figure 11:
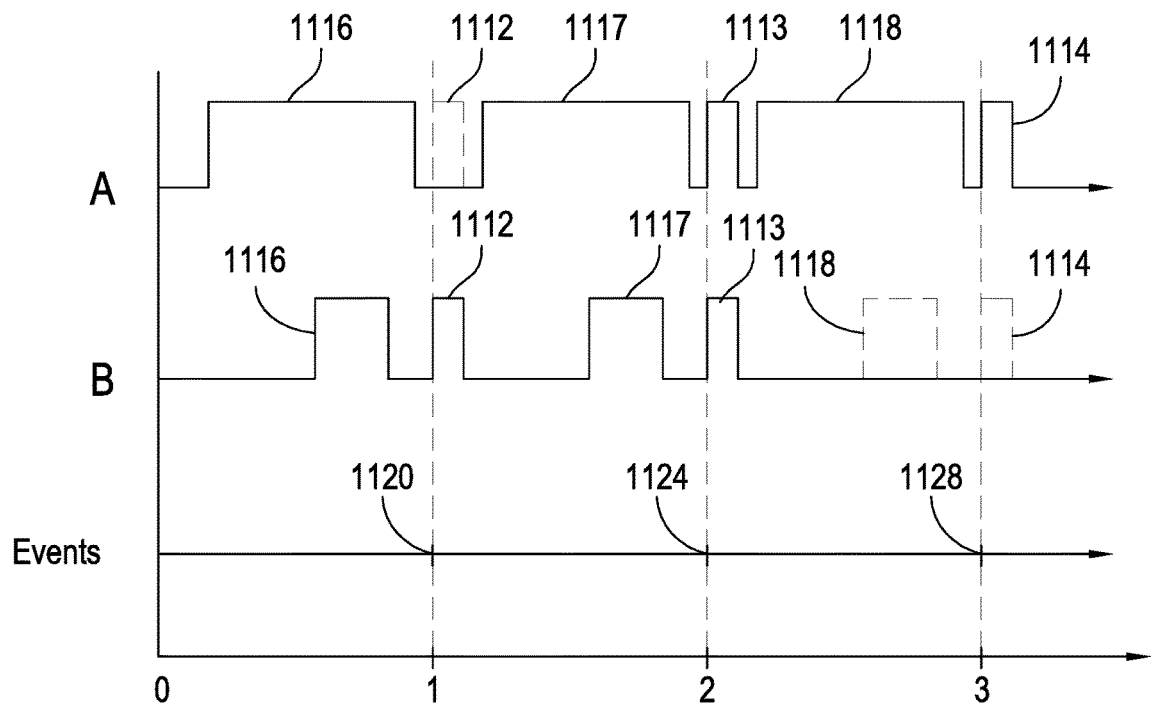

The operation of this example of the disclosed system is illustrated in FIG. 11. In FIG. 11, data 1116, 1117, 1118 are transmitted using both low latency link A and high latency link B. Triggering signals 1112, 1113, and 1114 may also be transmitted over both link A and link B as illustrated in response to events 1120, 1124, and 1128. In this configuration, the high and low latency links A and B respectively provide redundancy so that if triggering or command data fails to be transmitted or received, (such as signal 1112 on link A or data 1118 and triggering signal 1114 on link B) the data may still be passed to the remote communications node through another communications link. Signals 1112 or 1114 may not be received or sent for any number of reasons such as equipment failures, changes in atmospheric conditions, severed or damaged fiber-optic cables, damage to antennas or antenna arrays, and the like.

As illustrated in FIG. 11, link A may require additional time to transfer data 1116, 1117, 1118 where low latency link A has a lower data bandwidth then high latency link B. In other examples, these situations may be reversed where high latency link B takes longer to transfer data than low latency link A, or both links A and B may take about the same amount of time. FIG. 11 illustrates that, for example, data 1116 may take longer to transmit on low latency/low bandwidth link A then on high latency/high bandwidth link B.

Figure 12:
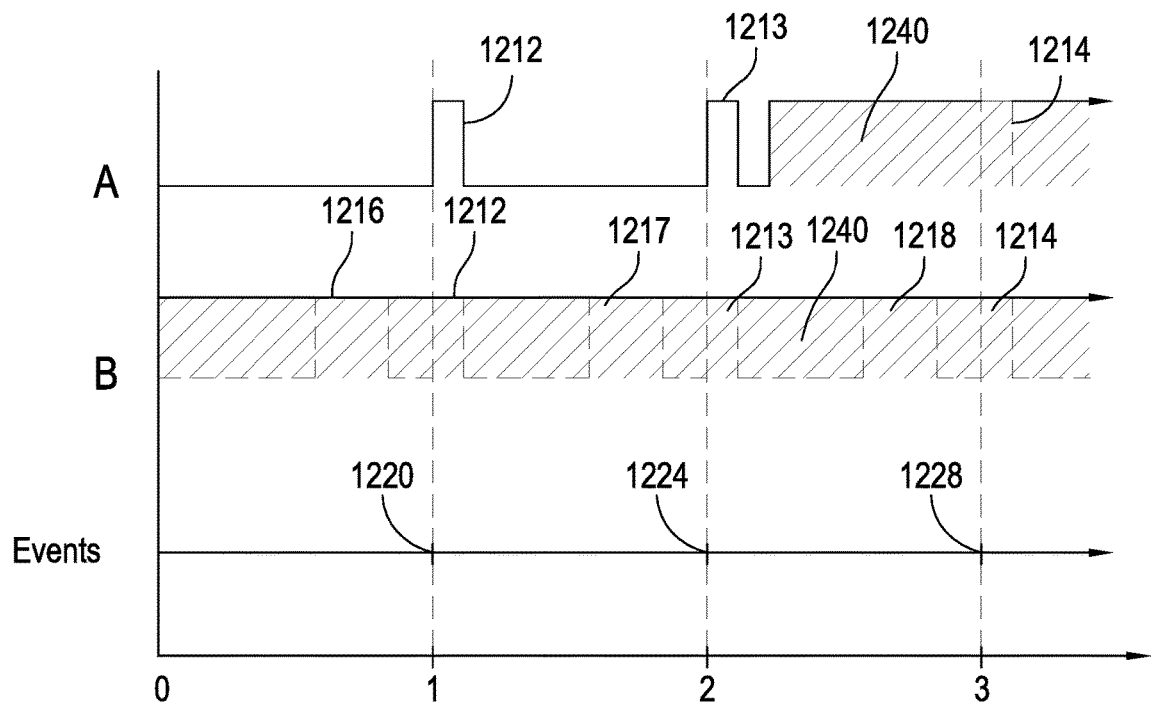

FIG. 12 illustrates another example of a low latency/low bandwidth link A transferring commands and triggering data corresponding to command and triggering data passed over a high latency/high bandwidth link B. In this example, data 1216 is transferred over link B ahead of an event 1220. Triggering signal 1212 is passed over link A in response to event 1220 to activate or execute commands, rule comparisons or other instructions corresponding with data 1216. In this example, high latency link B transfers data 1216 as part of a steady stream of encoded data transmissions 1240. Encoded data 1240 may include hashed, encrypted, or otherwise obfuscated data transmissions to mask data 1216 reducing or eliminating the opportunity for unauthorized access. This data encoding may use any suitable technique such as public or private key encryption, one or 2-way hashing, and the like. In this example, encoded data stream 1240 is transferred continuously over high latency link B and includes data 1216, 1217, and 1218, along with triggering signals 1212, 1213, and 1214. FIG. 12 also illustrates that the system may be configured to transmit triggering signals without including them in encoded data 1240 (1212, 1213), and may optionally begin sending the encoded stream 1240 over low latency link A along with a later set of triggering data 1214. By sending a continuous stream of data that may or may not include command or triggering data, unauthorized access to commands encoded in transmissions 1240 may be reduced or eliminated altogether in advance of events 1220, 1224, and 1228.

Transmissions sent on low latency link A may also be encoded to reduce or eliminate the opportunity for unauthorized access and may or may not be sent in tandem with encoded data 1240. As illustrated in FIG. 12, triggering signal 1212 may be sent without being part of a continuous stream of encoded data while in another example, a similar triggering signal 1214 may be sent as part of encoded data 1240. With low latency link A, similar encoding techniques may be used for the data such as public or private key encryption, one-way or two-way hashing, or other suitable means of obscuring triggering data 1214. By sending triggering data as part of a continuous encoded data stream, unauthorized access may be reduced or eliminated as triggering signals may be time sensitive making it prohibitively expensive to determine the contents of the triggering signal before it is either used or its usefulness expires.

Figure 13:
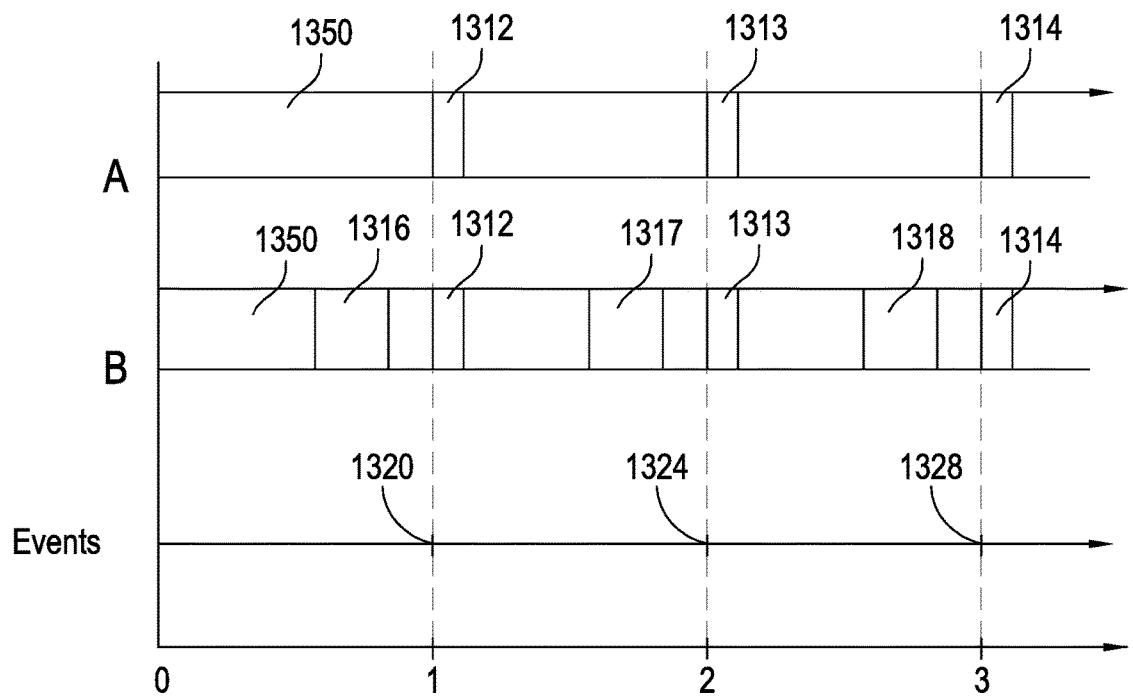

Another example of the disclosed system in operation is illustrated in FIG. 13 where triggering signals 1312, 1313, 1314 may correspond with low latency link A ceasing to send a carrier signal or data stream 1350. The communication nodes may be configured to receive carrier 1350 and may be triggered to accept a triggering signal 1312, 1313, or 1314 when carrier 1350 ceases to be sent ahead of sending the triggering signal. Carrier signal 1350 may include a continuous digital or analog signal sent by skywave propagation, or by any other suitable means. The signal may include a continuous analog signal at a single frequency, a signal that varies continuously with time, or other suitable signal. Carrier signal 1350 may also include digital data transmissions including, for example, a repeated series of datagrams containing information that remains the same, or changes in a predictable fashion with time.

A dropout or change in the carrier signal, for example at 1315, may indicate a triggering signal to the receiving communications node, or that a triggering signal is about to be sent. This example may be characterized as a communications node configured to trigger a response based on data 1316, 1317, 1318 on a "signal low" condition such as when the carrier 1350 stops transmitting at 1315 just ahead of the transmission of triggering signal 1312, 1313, or 1314. High latency link B may be configured similarly. The use of a carrier 1350 may be used in conjunction with any other methods illustrated in FIGS. 10-13, or any combination thereof, to respond to any events discussed above.

In any of the examples disclosed herein (such as in FIGS. 10-13), overall security of the system may be enhanced by sending a continual stream of actions and/or triggering messages over the separate communications links to confuse malicious third parties and discourage attempts to intercept and decipher future transmissions. The same messages may be sent over multiple links simultaneously, over separate transmitters and receivers with different propagation paths, or in any combination thereof. These messages may be very short, or intermingled with other transmissions and may be sent continuously, or for only short periods of time on a predetermined schedule. In a related aspect, security may be enhanced by sending short messages over skywave propagation on one or more frequencies, or by sending small parts of a message on several frequencies at the same time. Various additional techniques may also be employed to enhance security such as encryption, two-way hashing, and the like, which may incur additional latency in both links.

No association in the time required to pass data of the same or similar size across both links should be interpreted from FIGS. 10-13. Although FIGS. 10-13 may illustrate a relationship between the length of time required for high latency/high bandwidth link B to transfer data versus low latency/low bandwidth link A, FIGS. 10-13 is illustrative rather than restrictive Link A make take more or less time to send data of the same size as Link B and vice versa.

In any of the communication links illustrated in FIGS. 10-13, skywave propagation may be used to transmit data. For example, both links A and B may be low latency links using skywave propagation as discussed herein. In this example, low latency links A and B may both be configured for high or low data bandwidth. In another example, both links A and B may be high latency links using propagation techniques other than skywave propagation such as electromagnetic waves passed through fiber-optic cables, copper wire, and the like to name a few nonlimiting examples. High latency links A and B may be configured for high or low data bandwidth.

Figure 14:
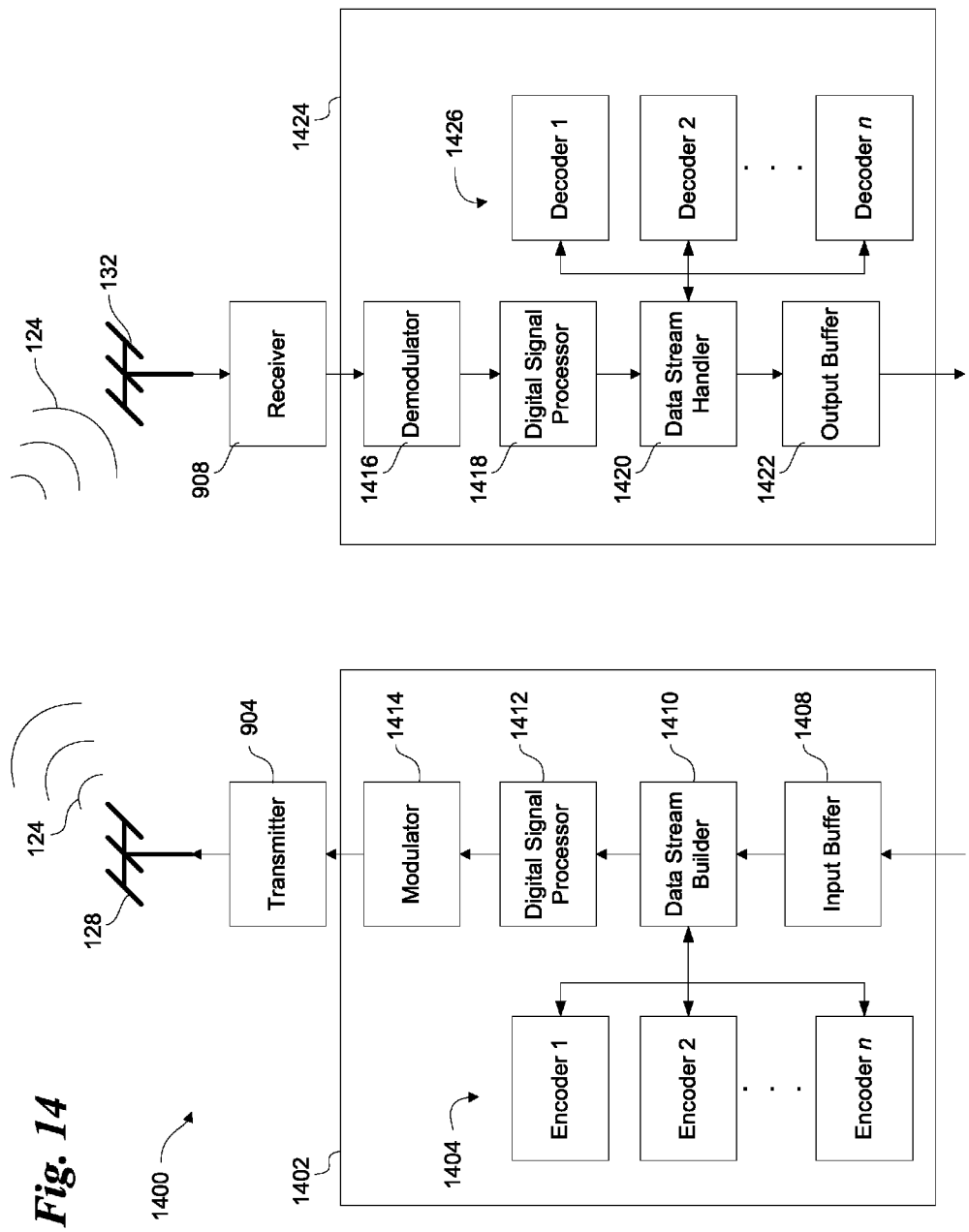
FIG. 14 is a schematic diagram illustrating one example of components that may be used in the modem of FIG. 8 to encode and decode data frames containing triggering information.

One example of how data (e.g. triggering data) may be prepared and transferred via a communications link such as a low latency/low bandwidth link is illustrated in FIG. 14 at 1400. The following principles discussed with respect to a low latency/low bandwidth link may be applied to any communications links such as the disclosed high latency/high bandwidth link. In FIG. 14, a modem 1402 operating as a sending modem may be coupled to a transmitter 904, and a modem 1424 may operate as a receiving modem and may be coupled to a receiver 908. Modem 1402 and 1424 may be operated as part of an RF communication interface 812 and arranged similarly to modem 912 in FIG. 9. Like modem 912, modem 1402 and 1424 may include any suitable hardware and/or software components for transmitting or receiving a stream of data as an analog or digital signal, or both. Modems 1402 and 1424 are here shown separately configured to send and receive. This configuration is illustrative rather than restrictive as any of the modems discussed herein may include all the components and functionality of both modems 1402 and 1424.

As illustrated, modem 1402 includes input buffer 1408 which includes a memory for retaining data structures, characters, strings, or other logical units of data to be transmitted. Data stream builder 1410 retrieves this data from input buffer 1408 and employs one or more encoders 1404, each encoding the data using one or more different encoding algorithms. These encoders 1404 may be implemented as a single encoder circuit with multiple encoding algorithms, or as multiple individual decoder circuits each implementing a different algorithm.

Each encoder encodes information into a stream of digital bits representing the data to be transmitted. Encoders 1404 are configured to execute multiple rules, make logical comparisons or decisions, and otherwise operate to create a sequence of bits representative of the data to be transmitted. The sequence may or may not include header information, delimiters, security information, CRC codes or other metadata associated with the data in input buffer 1408 that is to be transmitted. Different encoders 1404 may use different rules thus generating perhaps multiple bit streams representing the same information as will be discussed in further detail below. The data stream builder can assemble, prioritize, and choose which of these encoded bit streams to transmit and in what order. The resulting data stream is delivered to a digital signal processor 1412 which performs various functions such as digital to analog conversion, and the like in preparation for transmitting the stream of data. A modulator 1414 may also be included to modulate the resulting digital or analog signal. Such modulation may include modulating the signal using one or more carrier waves generated by carrier wave generators in modulator 1414. Modulated signal may then be sent to a transmitter 904 where it may be transmitted from antenna 128 through free space using electromagnetic signals 124. This over the air transmission may occur as high-frequency radio waves using skywave propagation as disclosed herein elsewhere, or using any suitable transmitter and receiver passing signals through any medium such as an optical fiber.

Signals 124 may be received by receiving antenna 132 and passed to a receiver 908 and then to receiving modem 1424. Modem 1424 may include a demodulator 1416 configured to accept signals from the receiver and performs one or more demodulation functions to obtain an unmodulated data signal. The signal may be processed by the digital signal processor 1418 which may be the same processor as digital signal processor 1412. Digital signal processor 1418 may perform any suitable processing functions such as converting an analog signal to a digital signal, applying one or more filters to reduce or eliminate interference or to enhance the signal. The resulting digital signal is accepted by data stream handler 1412 which decodes the signal using one or more decoders 1426.

Decoders 1426 correspond to encoders 1404 such that signals encoded by one of the encoders 1404 may be decoded by at least one decoder 1426. For example, decoders 1426 may include rules for parsing and analyzing stream of bits to transform a stream of digital data into meaningful information. Such information may include strings of characters, a program data or data structures such as software objects, structures, arrays of values, and the like, or any other suitable machine or human recognizable data.

Figure 15:
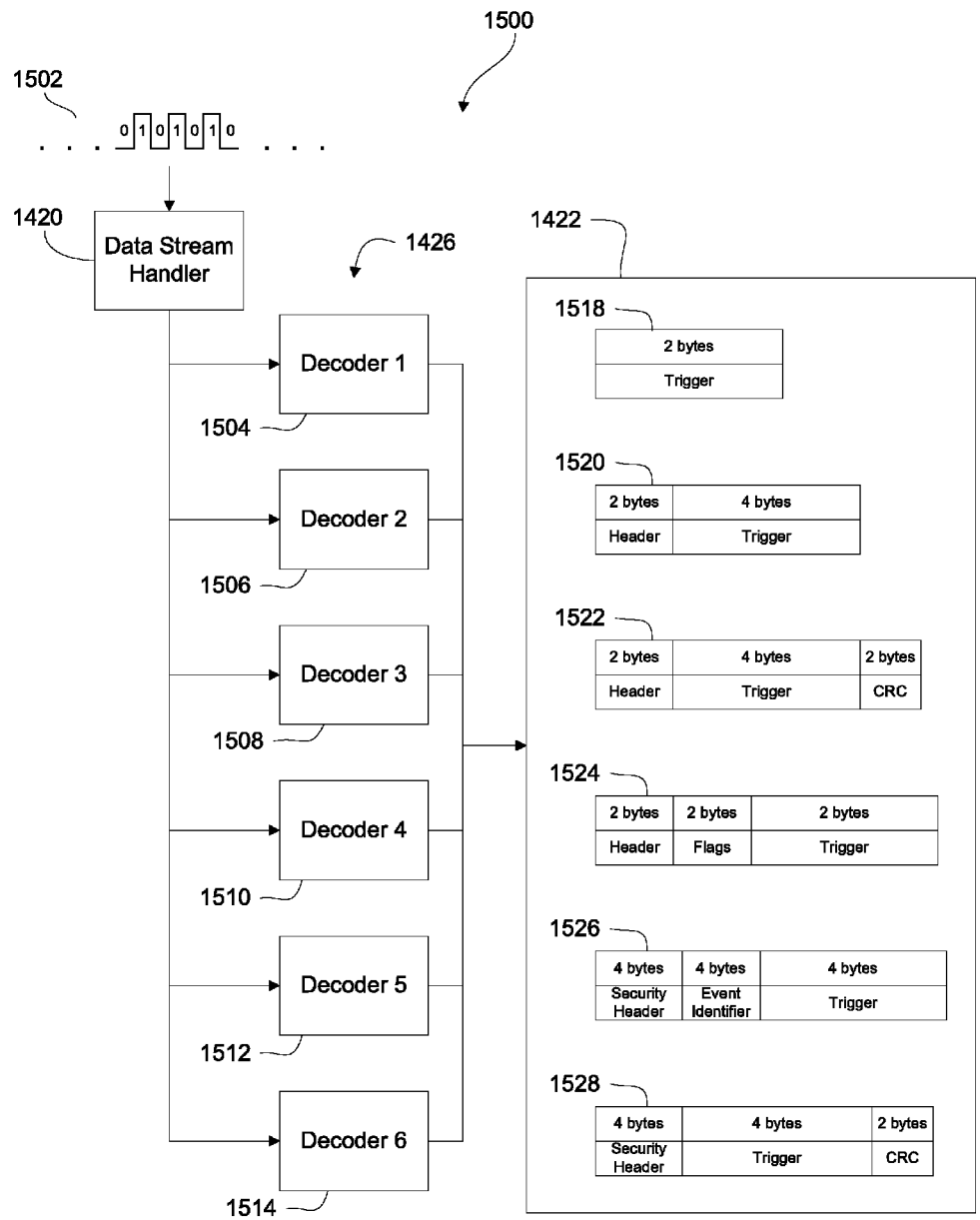
FIG. 15 is a schematic diagram illustrating example layouts of different data frames that may be generated using the decoders of FIG. 14.

Examples of data frames that may be sent and received by modems such as 912, 1402, and 1424 are illustrated at 1500 in FIG. 15. A data stream 1502 comprising patterns of ones and zeros encoded by an encoder 1404 is handled by data stream handler 1420 according to one or more decoders 1426. In one example, decoder 1504 decodes a frame 1518 from the data stream that includes triggering data. In this example, the triggering data is a simple 2 byte data structure and is free of any other delimiters, headers, flags, and the like. Decoder 1504 may, for example, be configured to parse data stream 1502 into 2 byte frames and compare these frames against a collection of predetermined triggering data structures. If the 2 byte frame matches a known data structure, then triggering data 1518 is recognized as meaningful data and may therefore be stored in output buffer 1422 for retrieval by other parts of the system disclosed herein such as triggering system 840. If decoder 1504 applies its decoding rules and this does not result in valid data, then the decoder may generate an error code and discard data frame 1518 as invalid data. The decoder may also log or report this negative result for future analysis. Triggering data 1518 is an example of a frame retrieved from a data stream without the need for headers, inter-frame gaps, or other delimiting frames or features.

In another example, decoder 1506 analyzes data stream 1502 looking for patterns of bits matching triggering data in frame 1520. In this example, decoder 1506 may parse data stream 1502 into 6 byte chunks, compare the bits against one or more acceptable 2 byte headers and or one or more acceptable 4 byte trigger data structures. If decoder 1506 determines that the header and the trigger data are valid, triggering data 1520 may be retained in output buffer 1422, or discarded otherwise as invalid. Similar actions may be taken by decoders 1508, 1510, 1512, and 1514 each applying rules and comparing the bit stream 1502 against different configurations of headers, flags, triggering data, security or encryption information, event identification, or cyclical redundancy check friend CRC) information as shown. In each case, the triggering data varies in length and complexity with larger arrangements of data possibly requiring additional decoding and processing time. The additional time may be necessary to parse and compare delimiters, headers, security and/or encryption information, or CRC codes to be sure the data in frames 1518, 1520, 1522, 1524, 1526, and/or 1528 is valid. This parsing and rule comparison stage may be performed by a processor such as processor 804, or by a specialized logic circuit such as an Field Programmable Gate Array (FPGA), or an Application Specific Integrated Circuit (ASIC) configured or adapted to perform multiple comparisons, perhaps in parallel, on a given set of bits to quickly determine whether they represent a valid frame.

Data stream handler 1504 is thus optimized to use multiple decoders or decoding algorithms to simultaneously handle multiple data encoding schemes that may be present in the same data stream 1502. The system may send the same data encoded different ways, or send different data or different types of data using different encoding schemes. This allows shorter frames (that may also be less reliable) to be handled faster with less processing overhead than larger, more complex frames, while also allowing for additional security, and integrity checks to be integrated into the system and used as needed. For example, encoders 1404 may be configured to continuously generate bit streams using all available encoders, some of the available encoders, or only one available encoder.

The decision to determine what type of encoding to use may involve comparing current operating parameters of the system shown in FIG. 1 and elsewhere against logic or rules using processor 804. Such parameters may include, but are not limited to, current transmitting frequency, maximum usable frequency, ionospheric conditions, recent error rates as reported by the decoders, time of day, quantity of data to transmit, and the like. For example, when conditions for skywave propagation allow for clear communications with minimal signal-to-noise ratios, an encoder corresponding to decoder 1504 may be used to decode the data because it may allow for transmission of data without delimiters thus reducing the latency involved in transmitting triggering data while the risk of garbled communication is low. In another example, when atmospheric conditions are less than optimal, an encoder corresponding to decoder 1508 may be used because it may include additional delimiting and error checking information which may be used to better validate data and facilitate automatic retransmission. In another example, it may become important at certain times of day, or because of recent perceived security threats to begin sending security information such as a security header like those included in triggering data 1526 and 1528. This may also include encrypting or otherwise obfuscating the data transmitted in each frame.

Thus some decoders such as 1512 and 1514 may simply reject all data from bit stream 1502 that is configured for other decoders like frame 1520 or 1524 until conditions change, and the encoder corresponding to decoder 1514 is selected. Conversely, when data in the new format begins to appear in the data stream 1502, decoders 1512 and 1514 begin to generate triggering data, and remaining decoders 1422 may then begin to fail to generate valid data according to other formats. In another example, encoders 1404 may all encode the same trigger data continuously thus allowing decoders 1504-1514 to all receive and process the same triggering data formatted differently at about the same time allowing the system to use the first triggering data to appear in output buffer 1422 regardless of which decoder delivered it first. In this way, multiple encoding algorithms may be used depending on desired levels of latency, error correction and detection, or security. Encoding algorithms can thus be changed in real time without headers or control codes to notify the receiving entity of the change.

Figure 16:
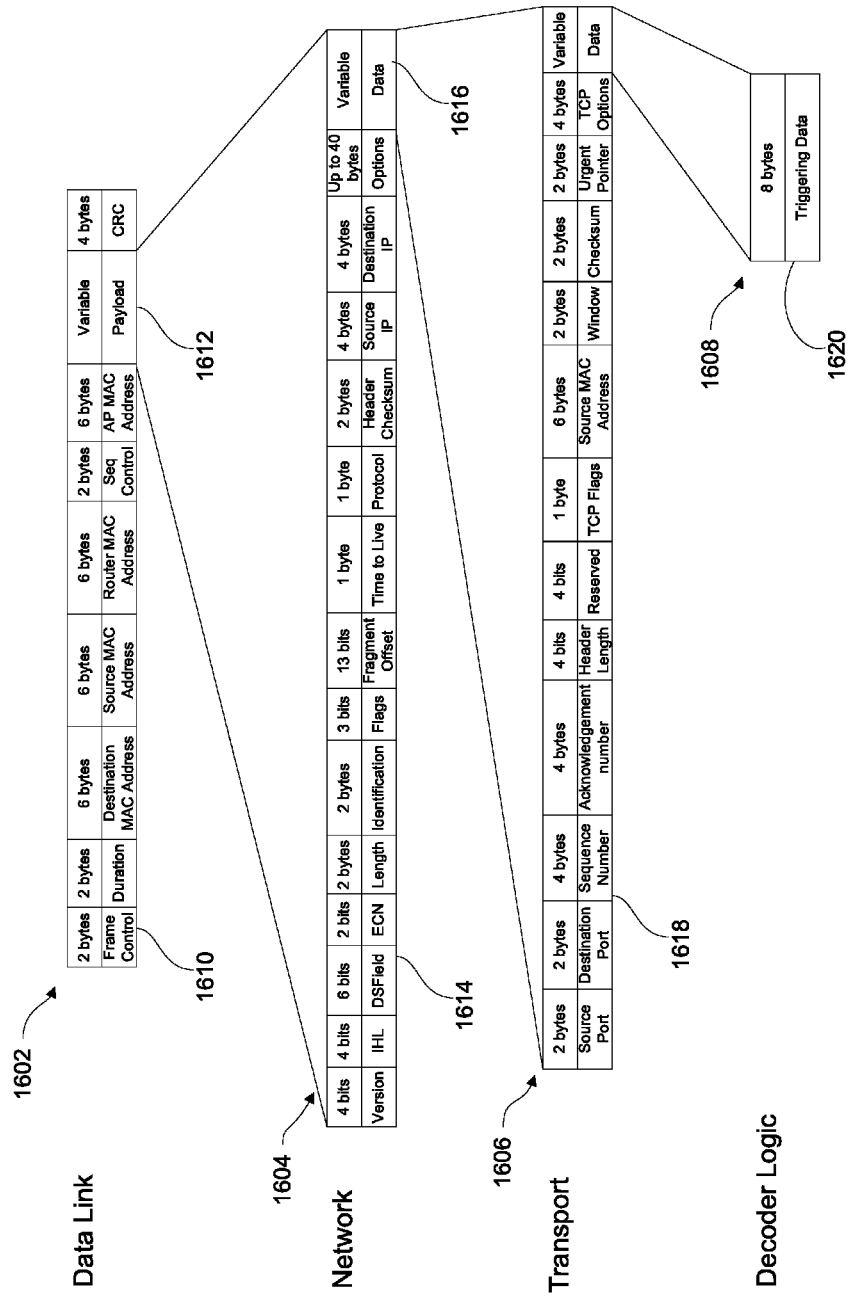
FIG. 16 is a schematic diagram illustrating another example of a layout for a data frame that may be generated using the decoders of FIG. 14

Another example of a frame containing triggering data 1608 appears in FIG. 16. In this example, triggering data 1620 may be formatted according to any of the formats shown in FIG. 15, or in any other suitable format. It may be packaged with transport headers 1618 as part of a transport packet 1606. Packet 1606 me itself be included as data 1616 within a packet or segment 1604 with network headers 1614. Segment 1604 may itself be part of payload 1612 with headers 1610 which are together part of a frame 1602 prepared for sending over a datalink such as communication links 104 and/or 108. In this example, triggering data 1620 is included as part of a more elaborate layered encoding approach configured and adapted to facilitate transmitting trigger or other data over a communications link with multiple complex headers implementing physical and/or logical protocols such as TCP/IP, Ethernet, and the like. With this more elaborate arrangement of multiple additional header information, triggering data 1620 is more likely to be received, but requires significantly more processing time throughout the encoding, transmission, and decoding process making it optimized to ensure delivery, while increasing processing latency. In any case, data stream 1502 may or may not include information indicating how to process each frame, the message length, and/or any specialized control codes. Frames Sizes for triggering data may be a standard length, may have variable lengths, or may have two or more predetermined sizes. These variations may be encoded by encoders 1404, and decoded from the data stream by corresponding decoders 1426.

When the disclosed system is in operation, commands or command data may be sent by the disclosed system using a transmitting communications node such as node 112 or node

1500 configured to transmit command data. The system may wait for a triggering event and send triggering data when a triggering event occurs. A receiving communications node (e.g. like nodes 116 or 800) may then execute commands included in the command data accordingly.

Command data may be received or created. For example, the data may be received from a transmitting third-party, or data may be processed by the system itself to generate one or more commands. One example of command data is a collection of one or more trades to be executed by financial exchanges. The commands may include orders to automatically buy and/or sell financial instruments based on various rules or preconditions. These rules or preconditions may include buying or selling if the market is at a certain price, if one or more technical indicators signals a purchase or sale, or if certain market data received from private or government entities contains particular values corresponding to a predetermined level (e.g. "new housing starts", "gross domestic product", interest rates on government bonds, and the like).

A security protocol may optionally be applied to the command data. Such security protocols may include encrypting the command data using public or private key encryption techniques, scrambling the data, and/or applying an encoding algorithm such as two-way hashing, and the like. Any suitable technique for securing command data may be used to make the data unreadable or unusable by third parties.

Command data can be transmitted from a transmitting communication node to a receiving communications node. Any suitable technique for communicating command data may be used such as sending the command data as a series of signals, packets, are datagrams of any suitable size. The transmission of either the command data, or the triggering data (or both) may occur over a low latency low bandwidth communication link such as communication link 104, or over a high latency high-bandwidth communication link such as communication link 108. Command data may also be transmitted by multiple communication links such as communication links 104 and 108 sequentially or at about the same time. The transmitted command data may be received by a receiving communications node using any of the communication links discussed herein. The system may optionally check the integrity of the data received and may optionally coordinate with a transmitting communication node to automatically resend the data if portions of it were not received or were corrupted in transmission.

When command data has been received at a receiving communications node, the commands may be prepared for execution. Such preparation may include upgrading or replacing software stored in a memory on a computer to be executed by a processor or other circuitry when a triggering event occurs. In another example, preparing commands for execution at may include programming a Field Programmable Gate Array (FPGA) to automatically perform the commands. This process may occur by any suitable means such as by performing a firmware upgrade on a computer that uses an FPGA or similar reprogrammable circuitry. When the commands of been prepared for execution, the system may then wait for a triggering event to take place.

The system may execute various other activities while waiting for a triggering event to take place. If no triggering event has occurred, various actions may be taken by a communications node at either end of a communications link, or at both ends. These actions may be the taken continuously while waiting for a triggering event to take place either simultaneously (in parallel), or in a sequential fashion, or in any suitable combination thereof.

For example, the system may determine a maximum usable frequency. This action might be taken to maintain a communication link such as link 104 that communicates via skywave propagation. The maximum usable frequency may be automatically determined experimentally by using a processor like processor 1504 to control transmitter 1604 to send signals over a broad range of frequencies in the electromagnetic spectrum. The processor may also control receiver 1608 to listen for responses from other transmitting communication nodes. The processor may then analyze the signal sent and the responses received to determine the maximum usable frequency that may be used to achieve communication with various remote communications nodes.

In another example, the maximum usable frequency may be predicted or determined by propagation data provided by third parties such as government entities. Such third parties may continuously monitor skywave propagation across a broad range of frequencies and distances providing this propagation data as an aid in calculating skip distances across a range of frequencies in the electromagnetic spectrum. Software modeling of distances, atmospheric conditions, and any other factors impacting propagation may also be used to determine the maximum usable frequency.

The system may determine a minimum usable frequency. The minimum usable frequency may be determined experimentally as described above, or by receiving and processing updated third-party propagation data. The maximum and minimum usable frequencies may then be stored in a memory accessible by the processor.

When the system is waiting for an event, a communication node may transmit a steady stream of signals that may or may not contain any useful data. The signals or data are prepared for transmission, and as discussed above, the transmission may or may not include meaningful command data or triggering data. They communication node may, for example, send a transmission at a regular interval, or with a specific sequence of data. In this way a communication node may maintain a communication link thereby quickly become aware when the communication link is compromised.

Where a communication link uses skywave propagation (such as communication link 104), the system may choose a transmission frequency using the processor or other logic circuit. Choosing a transmission frequency may include selecting a frequency between the minimum and maximum usable frequencies determined previously. This may be done in accordance with a "frequency hopping" system configured to repeatedly choose a different frequency over time for transmitting and receiving. Choosing a transmission frequency may also include selecting a frequency from a predetermined set or range of frequencies such as in a spread spectrum "signal hopping" configuration. The frequency may be determined according to any suitable technique such as by Multiple-input/Multiple-output (MIMO) using multiple transmitters or receivers at different frequencies. The data may then be transmitted once the transmission frequency is determined.

When a triggering event occurs, triggering data can be sent. Triggering data may be prepared which may include extracting or receiving the triggering data from a third-party data source and configuring it for transmission over a communications link such as communication link 104 or 108. A security protocol may be applied to the triggering data to reduce or eliminate the opportunity for third-party individuals to obtain triggering data without authorization. Any suitable security protocol may be applied as discussed herein elsewhere.

A transmission frequency may then be chosen. Examples include selecting a frequency between the maximum and minimum usable frequencies as previously determined, or by selecting a frequency from a predetermined set of frequencies such as in a "signal hopping" configuration. In another example, the system may transmit over multiple frequencies a the same time. The system may then transmit the triggering data at along one or more communications links as discussed herein elsewhere.

A receiving communications node may receive triggering data. A security protocol may be applied to unscramble, decrypt, decode, or otherwise remove any security measures that may have been applied when the triggering data was sent. A processor may then process the triggering data to identify commands to execute based on an identifier sent in the triggering data. Triggering data may also include multiple identifiers identifying multiple commands to execute. The system may then execute the commands identified in the triggering data.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Directional Antenna" or "Beam Antenna" generally refers to an antenna that radiates or receives greater power in specific directions allowing for increased performance and/or reduced interference from unwanted sources. Directional antennas typically, but not always, concentrate radiation in or from a desired direction.

"Steerable Antenna" generally refers to a directional antenna whose major lobe can be readily shifted in direction.

"Electronically Steerable Antenna" generally refers to a type of steerable antenna in which the beam of radio waves or other electromagnetic radiation can be electronically to pointed in different directions without physically moving the antenna. The electronically steerable antenna can for example include an active electronically scanned array (AESA) or a passive electronically scanned array (PESA). In one example, the electronically steerable antenna can include a phased array.

"Mechanically Steerable Antenna" generally refers to a type of steerable antenna in which the beam of radio waves or other electromagnetic radiation can be pointed in different directions by physically moving the antenna.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link figured to respond to one another by physical movement of one element in relation to another. In the case of an electrical link, the communication link may be composed of multiple electrical conductors electrically connected to form the communication link.

In the case of an electromagnetic link, elements the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station in the receiving station. Logical link may include any combination of physical, electrical, electromagnetic, or other types of communication links.

"Communication node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Critical angle" generally refers to the highest angle with respect to a vertical line extending to the center of the Earth at which an electromagnetic wave at a specific frequency can be returned to the Earth using sky-wave propagation.

"Critical Frequency" generally refers to the highest frequency that will be returned to the Earth when transmitted vertically under given ionospheric conditions using sky-wave propagation.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz.

Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Demodulator" generally refers to a device that is adapted are configured to perform demodulation, the inverse of modulation. One example of such a device is a "modem" which can perform modulation and demodulation.

"Datagram" generally refers to a basic transfer unit associated with a packet-switched network. Datagrams may include a header and payload sections. Datagrams provide a connectionless communication service across a packet-switched network. The delivery, arrival time, and order of arrival of datagrams need not be guaranteed by the network.

"Electromagnetic Spectrum" generally refers to the range of all possible frequencies of electromagnetic radiation. The electromagnetic spectrum is generally categorized as follows, in order of increasing frequency and energy and decreasing wavelength:

"Extremely low frequency" (ELF) generally designates a band of frequencies from about 3 to about 30 Hz with wavelengths from about 100,000 to 10,000 km long.

"Super low frequency" (SLF) generally designates a band of frequencies generally ranging between about 30 Hz to about 300 Hz with wavelengths of about 10,000 to about 1000 km long.

"Voice frequency" or "voice band" generally designates electromagnetic energy that is audibles to the human ear. Adult males generally speak in the range between about 85 and about 180 Hz while adult females generally converse in the range from about 165 to about 255 Hz.

"Very low frequency" (VLF) generally designates the band of frequencies from about 3 kHz to about 30 kHz with corresponding wavelengths from about 10 to about 100 km long.

"Low-frequency" (LF) generally designates the band of frequencies in the range of about 30 kHz to about 300 kHz with wavelengths range from about 1 to about 10 km.

"Medium frequency" (MF) generally designates the band of frequencies from about 300 kHz to about 3 MHz with wavelengths from about 1000 to about 100 m long.

"High frequency" (HF) generally designates the band of frequencies from about 3 MHz to about 30 MHz having wavelengths from about 100 m to about 10 m long.

"Very high frequency" (VHF) generally designates the band of frequencies from about 30 Hz to about 300 MHz with wavelengths from about 10 m to about 1 m long.

"Ultra high frequency" (UHF) generally designates the band of frequencies from about 300 MHz to about 3 GHz with weight wavelengths ranging from about 1 m to about 10 cm long.

"Super high frequency" (SHF) generally designates the band of frequencies from about 3 GHz to about 30 GHz with wavelengths ranging from about 10 cm to about 1 cm long.

"Extremely high frequency" (EHF) generally designates the band of frequencies from about 30 GHz to about 300 GHz with wavelengths ranging from about 1 cm to about 1 mm long.

"Far infrared" (FIR) generally designates a band of frequencies from about 300 GHz to about 20 THz with wavelengths ranging from about 1 mm to about 15 µm long.

"Long-wavelength infrared" (LWIR) generally designates a band of frequencies from about 20 THz to about 37 THz with wavelengths ranging from about 15 µm to about 8 µm long.

"Mid infrared" (MIR) generally designates a band of frequencies from about 37 THz to about 100 THz with wavelengths from about 8 µm to about 3 µm long.

"Short wavelength infrared" (SWIR) generally designates a band of frequencies from about 100 THz to about 214 THz with wavelengths from about 3 µm to about 1.4 µm long "Near-infrared" (NIR) generally designates a band of frequencies from about 214 THz to about 400 THz with wavelengths from about 1.4 µm to about 750 nm long.

"Visible light" generally designates a band of frequencies from about 400 THz to about 750 THz with wavelengths from about 750 nm to about 400 nm long.

"Near ultraviolet" (NUV) generally designates a band of frequencies from about 750 THz to about 1 PHz with wavelengths from about 400 nm to about 300 nm long.

"Middle ultraviolet" (MUV) generally designates a band of frequencies from about 1 PHz to about 1.5 PHz with wavelengths from about 300 nm to about 200 nm long.

"Far ultraviolet" (FUV) generally designates a band of frequencies from about 1.5 PHz to about 2.48 PHz with wavelengths from about 200 nm to about 122 nm long.

"Extreme ultraviolet" (EUV) generally designates a band of frequencies from about 2.48 PHz to about 30 PHz with wavelengths from about 121 nm to about 10 nm long.

"Soft x-rays" (SX) generally designates a band of frequencies from about 30 PHz to about 3 EHz with wavelengths from about 10 nm to about 100 µm long.

"Hard x-rays" (HX) generally designates a band of frequencies from about 3 EHz to about 30 EHz with wavelengths from about 100 µm to about 10 µm long.

"Gamma rays" generally designates a band of frequencies above about 30 EHz with wavelengths less than about 10 μm long.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Frame" or "Data Frame" generally refers to a digital data transmission unit. A frame may include a sequence of bits or symbols that indicate to the receiver, the beginning, and end of the payload data within the stream of symbols or bits representing the frame.

"Frequency Bandwidth" or "Band" generally refers to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 Mhz to 3 GHz as the "UHF band".

"Fiber-optic communication" generally refers to a method of transmitting data from one place to another by sending pulses of electromagnetic energy through an optical fiber. The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Geodesic Line" generally refers to the shortest possible line between two points on a sphere or other curved surface.

"Ground" is used more in an electrical/electromagnetic sense and generally refers to the Earth's surface including land and bodies of water, such as oceans, lakes, and rivers.

"Ground-wave propagation" generally refers to a transmission method in which one or more electromagnetic waves are conducted via the boundary of the ground and atmosphere to travel along ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those.

The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending among a number of factors including solar activity, such as sunspots. The various layers of the ionosphere are identified below.

The "D layer" of the ionosphere is the innermost layer that ranges from about 25 miles (40 km) to about 55 miles (90 km) above the Earth's surface. The layer has the ability to refract signals of low frequencies, but it allows high frequency radio signals to pass through with some attenuation. The D layer normally, but not in all instances, disappears rapidly after sunset due to rapid recombination of its ions.

The "E layer" of the ionosphere is the middle layer that ranges from about 55 miles (90 km) to about 90 miles (145 km) above the Earth's surface. The E layer typically has the ability to refract signals with frequencies higher than the D layer. Depending on the conditions, the E layer can normally refract frequencies up to 20 MHz. The rate of ionic recombination in the E layer is somewhat rapid such that after sunset it almost completely disappears by midnight. The E layer can further include what is termed an "Es layer" or "sporadic E layer" that is formed by small, thin clouds of intense ionization. The sporadic E layer can reflect radio waves, even frequencies up to 225 MHz, although rarely. Sporadic E layers most often form during summer months, and it has skip distances of around 1,020 miles (1,640 km). With the sporadic E layer, one hop propagation can be about 560 miles (900 km) to up to 1,600 miles (2,500 km), and double hop propagation can be over 2,200 miles (3,500 km).

The "F layer" of the ionosphere is the top layer that ranges from about 90 (145 km) to 310 miles (500 km) or more above the Earth's surface. The ionization in the F layer is typically quite high and varies widely during the day, with the highest ionization occurring usually around noon. During daylight, the F layer separates into two layers, the F1 layer and the F2 layer. The F2 layer is outermost layer and, as such, is located higher than the F1 layer. Given the atmosphere is rarified at these altitudes, the recombination of ions occur slowly such that F layer remains constantly ionized, either day or night such that most (but not all) skywave propagation of radio waves occur in the F layer, thereby facilitating high frequency (HF) or short wave communication over long distances. For example, the F layers are able to refract high frequency, long distance transmissions for frequencies up to 30 MHz.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$latency_{low} \leq \frac{d}{c} \cdot k \quad \text{(Equation 1)}$$

where
d=distance (miles)
c=the speed of light in a vacuum (186,000 miles/sec)
k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$latency_{high} > \frac{d}{c} \cdot k \quad \text{(Equation 2)}$$

where:
d=distance (miles)
c=the speed of light in a vacuum (186,000 miles/sec)
k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the Earth using sky-wave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Modulation" generally refers to a process of varying one or more properties of a periodic waveform, called a carrier signal, with a modulating signal that represents information to be transmitted. Common examples of modulation techniques include, but are not limited to, Frequency Modulation (FM), Amplitude Modulation (AM), Phase-Shift Keying (PSK), Frequency Shift Keying (FSK), Amplitude Shift Keying (Ask), off Keying (Oh Okay) Quadrature Amplitude Modulation (QAM) Continuous Phase Modulation (CPM), Orthogonal Frequency Division Multiplexing (OFD M) Wavelet Modulation, Trellis Coded Modulation (TCM), Direct Sequence Spread Spectrum (DSSS), Troop Spread Spectrum (CSS), and Frequency Hopping Spread Spectrum (FHSS).

"Modulator" generally refers to a device that is configured or adapted to perform modulation. One example of such a device is a "modem" which can perform both modulation and demodulation.

"Non-sky-wave propagation" generally refers to all forms of transmission, wired and/or wireless, in which the information is not transmitted by reflecting an electromagnetic wave from the ionosphere.

"Optimum Working Frequency" generally refers to the frequency that provides the most consistent communication path via sky-wave propagation. It can vary over time depending on number of factors, such as ionospheric conditions and time of day. For transmissions using the F2 layer of the ionosphere the working frequency is generally around 85% of the MUF, and for the E layer, the optimum working frequency will generally be near the MUF.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core.

Optical fibers are generally constructed of dielectric material that is not electrically conductive but is substantially transparent. Such materials may or may not include any combination of extruded glass such as silica, fluoride glass, phosphate glass, Chalcogenide glass, or polymeric material such as various types of plastic, or other suitable material and may be configured with any suitable cross-sectional shape, length, or dimension. Examples of electromagnetic energy that may be successfully passed through optical fibers include electromagnetic waves in the near-infrared, mid-infrared, and visible light portion of the electromagnetic spectrum, although electromagnetic energy of any suitable frequency may be used.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted abstention the vertically, and a different polarization when mounted substantially horizontally. As a transverse wave, the magnetic field of a radio wave is at right angles to that of the electric field, but by convention, talk of an antenna's "polarization" is understood to refer to the direction of the electric field.

Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location. Matching the receiving antenna's polarization to that of the transmitter may be especially important in ground wave or line of sight propagation but may be less important in skywave propagation.

An antenna's linear polarization is generally along the direction (as viewed from the receiving location) of the antenna's currents when such a direction can be defined. For instance, a vertical whip antenna or Wi-Fi antenna vertically oriented will transmit and receive in the vertical polarization. Antennas with horizontal elements, such as most rooftop TV antennas, are generally horizontally polarized (because broadcast TV usually uses horizontal polarization). Even when the antenna system has a vertical orientation, such as an array of horizontal dipole antennas, the polarization is in the horizontal direction corresponding to the current flow.

Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) as we have discussed above, and circular polarization (in which the two axes of the ellipse are equal). In linear polarization the electric field of the radio wave oscillates back and forth along one direction; this can be affected by the mounting of the antenna but usually the desired direction is either horizontal or vertical polarization. In circular polarization, the electric field (and magnetic field) of the radio wave rotates at the radio frequency circularly around the axis of propagation.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA.

Another example of a processor is an Application-Specific Integrated Circuit (ASIC). An ASIC is an Integrated Circuit (IC) customized to perform a specific series of logical operations is controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Radio" generally refers to electromagnetic radiation in the frequencies that occupy the range from 3 kHz to 300 GHz.

"Radio horizon" generally refers the locus of points at which direct rays from an antenna are tangential to the ground. The radio horizon can be approximated by the following equation:

$$d \approx \sqrt{2h_t} + \sqrt{2h_r} \quad \text{(Equation 3)}$$

where:

d=radio horizon (miles)

ht=transmitting antenna height (feet)

hr=receiving antenna height (feet).

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Skip distance" generally refers to the minimum distance from a transmitter to where a wave from sky-wave propagation can be returned to the Earth. To put it another way, the skip distance is the minimum distance that occurs at the critical angle for sky-wave propagation.

"Skip zone" or "quiet zone" generally refers to is an area between the location where a ground wave from ground wave propagation is completely dissipated and the location where the first sky wave returns using sky wave propagation. In the skip zone, no signal for a given transmission can be received.

"Satellite communication" or "satellite propagation" generally refers to transmitting one or more electromagnetic signals to a satellite which in turn reflects and/or retransmits the signal to another satellite or station.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units.

For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Sky-wave propagation" refers generally to a transmission method in which one or more electromagnetic-waves radiated from an antenna are refracted from the ionosphere back to the ground. Sky-wave propagation further includes tropospheric scatter transmissions. In one form, a skipping method can be used in which the waves refracted from the ionosphere are reflected by the ground back up to the ionosphere. This skipping can occur more than once.

"Space-wave propagation" or sometimes referred to as "direct wave propagation" or "line-of-sight propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about 4/5 greater than the geometric line of sight.

"Spread spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to re-assemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the Earth's atmosphere extending from the troposphere to about 25 to 35 miles above the earth surface.

"Transfer Rate" generally refers to the rate at which a something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line.

Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-site, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the Earth's atmosphere. The troposphere extends about 11 miles above the surface of the earth in the mid-latitudes, up to 12 miles in the tropics, and about 4.3 miles in winter at the poles.

"Tropospheric scatter transmission" generally refers to a form of sky-wave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Unmanned Aerial Vehicle (UAV)" or "Drone" generally refers to an aircraft without a human pilot aboard. A UAV may be operated via a ground-based controller by a human and/or can be operated autonomously using an onboard computer. A UAV may also operate without human or computer aided control and may be directed by environmental factors such as wind speed and wind direction. A drone may be powered or unpowered. A UAV may include a combustion type engine (e.g., a turbine) that is powered with fuel and/or may use alternative power sources such as electrical motors that are powered with solar cells and/or a battery. By way of non-limiting examples, the UAV can include balloons, dirigible airships, blimps, airplanes, helicopters, quadcopters, gliders, and/or other types of aircraft.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:
1. A method, comprising:
   transmitting command data from a transmission station via a first communication link, wherein the command data defines one or more commands;
   encoding triggering data with a first encoder using a first scheme to create a first frame;
   encoding the triggering data with a second encoder that uses a second scheme to create a second frame;
   wherein the first scheme and the second scheme are different;
   transmitting a stream of data that includes the first frame containing the triggering data and the second frame containing the triggering data via a second communication link, wherein the second communication link has smaller bandwidth than the first communication link;
   decoding the triggering data from the stream of data, wherein the decoding includes
      parsing with a first decoder using the first scheme the triggering data in the first frame from the stream of data,
      parsing with a second decoder using the second scheme the triggering data in the second frame from the stream of data, and
      wherein the first decoder and the second decoder process the stream of data at the same time;
   wherein the triggering data includes an identifier identifying at least one of the one or more commands;

wherein the second communication link transmits the triggering data using electromagnetic waves transmitted via skywave propagation;
wherein the first communication link has greater latency than the second communication link;
wherein the first frame and the second frame are different lengths.

2. The method of claim 1, wherein the second frame is larger than the first frame.

3. The method of claim 1, wherein the second frame includes a header and a payload, and the first frame includes the payload without the header.

4. The method of claim 1, wherein the second frame includes a Cyclic Redundancy Check (CRC) code and a payload, and the first frame includes the payload without the CRC code.

5. The method of claim 1, wherein the second frame includes security information and a payload, and the first frame includes the payload without the security information.

6. A method, comprising:
transmitting command data from a transmission station via a first communication link, wherein the command data defines one or more commands;
encoding trigger data using multiple different encoding schemes to generate multiple different data frames, each data frame containing the triggering data and having a different size;
transmitting triggering data as a data stream that includes the multiple different data frames from the transmission station via a second communication link that has smaller bandwidth than the first communication link;
decoding the data stream using multiple different decoding schemes corresponding to the multiple different encoding schemes using multiple decoders configured to parse the data frames with the triggering data from the data stream, wherein the triggering data includes an identifier identifying at least one of the one or more commands;
wherein the second communication link transmits the triggering data using electromagnetic waves transmitted via skywave propagation;
wherein the first communication link has greater latency than the second communication link;
wherein the multiple decoders simultaneously parse the data using the multiple different decoding schemes; and
wherein the triggering data in the multiple different data frames is the same.

7. The method of claim 6, wherein at least one of the multiple data frames is larger than at least one other of the multiple data frames.

8. The method of claim 6, wherein at least one of the multiple data frames includes a header and a payload, and at least one other of the multiple data frames is without the header.

9. The method of claim 6, wherein at least one of the multiple data frames includes a Cyclic Redundancy Check (CRC), code, and at least one other of the multiple data frames is without the CRC code.

10. The method of claim 6, wherein at least one of the multiple data frames includes security information, and at least one other of the multiple data frames is without the security information.

11. The method of claim 6, wherein the data stream is free of any metadata indicating how to process each frame.

12. The method of claim 6, wherein:
said decoding the stream is performed at a first time using a first portion of the multiple different decoding schemes; and
said decoding the stream is performed later at a second time using a different second portion of the multiple different decoding schemes.

13. The method of claim 12, wherein the first portion of the multiple different decoding schemes is used when a maximum usable frequency is above a predetermined threshold, and wherein the second portion of the multiple different decoding schemes is used when the maximum usable frequency is below the predetermined threshold.

14. The method of claim 6, wherein said transmitting the triggering data includes transmitting the electromagnetic waves below a critical angle.

15. The method of claim 6, further comprising:
receiving the command data at a receiving station remote from the transmission station; and
receiving the triggering data at the receiving station.

16. The method of claim 15, further comprising:
transmitting the command data on both the first communication link and the second communication link.

17. The method of claim 16, wherein said receiving the command data includes receiving the command data via the first communication link before receiving the command data via the second communication link.

18. The method of claim 16, wherein said receiving the command data includes receiving the command data via the second communication link before receiving the command data via the first communication link.

19. The method of claim 15, further comprising:
transmitting the triggering data on both the first communication link and the second communication link.

20. The method of claim 19, wherein said receiving the triggering data includes receiving the triggering data via the first communication link before receiving the triggering data via the second communication link.

21. The method of claim 19, wherein said receiving the triggering data includes receiving the triggering data via the second communication link before receiving the triggering data via the first communication link.

22. The method of claim 15, further comprising:
executing at least one of the one or more commands identified in the triggering data in response to said receiving the triggering data, wherein at least one of the commands is executed using a processor at the receiving station; and
wherein the commands includes instructions to buy or sell at least one financial instrument.

23. The method of claim 22, wherein said executing occurs on or after both the command data and the triggering data are fully received at the receiving station.

24. The method of claim 6, wherein the first communication link has larger bandwidth than the second communication link.

25. The method of claim 6, wherein the first communication link includes an optical fiber.

26. The method of claim 6, wherein the first communication link has a high data bandwidth configured to transmit at least 56,000 bits per second.

27. The method of claim 6, wherein the second communication link has a low data bandwidth configured to transmit less than 56,000 bits per second.

28. The method of claim 6, wherein the first communication link has a high latency of at least 60 ms.

29. The method of claim 6, wherein the second communication link has a low latency of less than 60 ms.

30. The method of claim 6, wherein the second communication link transmits the triggering data using multiple frequencies.

31. A method, comprising:
- transmitting command data from a transmission station via a first communication link, wherein the command data defines one or more commands;
- transmitting triggering data via a second communication link, wherein the second communication link has smaller bandwidth than the first communication link;
- receiving at a receiving station a stream of data that includes the triggering data from the transmission station;
- determining with a first decoder that a first scheme having the first frame produces invalid data when parsing the stream of data;
- discarding the invalid data from the first frame and issuing an error code;
- parsing with a second decoder the stream of data using a second scheme having the second frame to decode the triggering data;
- wherein the first scheme and the second scheme are different;
- wherein the first decoder and the second decoder process the stream of data at the same time;
- wherein the triggering data includes an identifier identifying at least one of the commands;
- executing the command identified by the identifier upon the triggering data being decoded via the parsing with the second decoder;
- wherein the second communication link transmits the triggering data using electromagnetic waves transmitted via skywave propagation;
- wherein the first communication link has greater latency than the second communication link; and
- wherein the first frame and the second frame are different lengths.

* * * * *